(12) United States Patent
Watanabe et al.

(10) Patent No.: US 12,522,859 B2
(45) Date of Patent: *Jan. 13, 2026

(54) METHOD AND KIT FOR DETECTING TARGET NUCLEIC ACID FRAGMENT

(71) Applicant: Riken, Wako (JP)

(72) Inventors: Rikiya Watanabe, Wako (JP); Osamu Nureki, Tokyo (JP); Hiroshi Nishimasu, Tokyo (JP)

(73) Assignee: Riken, Wako (JP)

( * ) Notice: Subject to any disclaimer, the term of this patent is extended or adjusted under 35 U.S.C. 154(b) by 1028 days.

This patent is subject to a terminal disclaimer.

(21) Appl. No.: 17/620,868

(22) PCT Filed: Jul. 6, 2020

(86) PCT No.: PCT/JP2020/026371
§ 371 (c)(1),
(2) Date: Dec. 20, 2021

(87) PCT Pub. No.: WO2021/002476
PCT Pub. Date: Jan. 7, 2021

(65) Prior Publication Data
US 2022/0348993 A1    Nov. 3, 2022

(30) Foreign Application Priority Data

Jul. 4, 2019 (JP) ................. 2019-125564

(51) Int. Cl.
*C12Q 1/6818* (2018.01)
*C12Q 1/6806* (2018.01)
*C12Q 1/6837* (2018.01)

(52) U.S. Cl.
CPC ......... *C12Q 1/6818* (2013.01); *C12Q 1/6806* (2013.01); *C12Q 1/6837* (2013.01)

(58) Field of Classification Search
CPC ................. C12Q 1/6818; C12Q 2565/629
See application file for complete search history.

(56) References Cited

U.S. PATENT DOCUMENTS

2017/0362644 A1   12/2017   Doudna et al.
2024/0094199 A1*   3/2024   Watanabe .............. C12Q 1/682

FOREIGN PATENT DOCUMENTS

EP        3 101 115 A1    12/2016
EP        3995833 A1       5/2022
(Continued)

OTHER PUBLICATIONS

Qin, P. et al. ACS Sensors 4:1048-1054 (Mar. 12, 2019). (Year: 2019).*

(Continued)

*Primary Examiner* — Diana B Johannsen
(74) *Attorney, Agent, or Firm* — Blank Rome LLP

(57) ABSTRACT

A method for detecting a target nucleic acid fragment in a sample, the method including a step of bringing the sample into contact with a gRNA, a Cas protein, and a substrate nucleic acid fragment, in which the Cas protein expresses nuclease activity after forming a complex with the gRNA and the target nucleic acid fragment, the substrate nucleic acid fragment is labeled with a fluorescent substance and a quenching substance, when the substrate nucleic acid fragment is cleaved by the nuclease activity so that the fluorescent substance is separated from the quenching substance, the fluorescent substance emits fluorescence due to excitation light, and the contact is performed in a reaction space having a volume of 10 aL to 100 pL so that when the target nucleic acid fragment is present in the sample, a tripartite complex is formed, the substrate nucleic acid fragment is cleaved, and the fluorescent substance is separated from the quenching substance; and a step of irradiating the fluorescent substance with the excitation light and detecting the (Continued)

fluorescence, in which detection of the fluorescence indicates that the target nucleic acid fragment is present in the sample.

11 Claims, 11 Drawing Sheets

Specification includes a Sequence Listing.

(56) References Cited

FOREIGN PATENT DOCUMENTS

| | | |
|---|---|---|
| JP | 2004-309405 A | 11/2004 |
| WO | WO 2008/105814 A2 | 9/2008 |
| WO | WO 2015/115635 A1 | 8/2015 |
| WO | WO 2019/098301 A1 | 5/2019 |
| WO | WO 2019/104058 A1 | 5/2019 |
| WO | WO 2019/126577 A2 | 6/2019 |
| WO | 2020/102608 A2 | 5/2020 |

OTHER PUBLICATIONS

Ansari, M.I. et al. Biosensors and Bioelectronics 85:247-260. (Year: 2016).*

Zhou, W. et al. Trends in Analytical Chemistry 112:175-195 (Mar. 2019). (Year: 2018).*

Ono, T. et al. Analyst 143:4923-4929 (Sep. 17, 2018). (Year: 2018).*

P.J. Asiello et al., "Miniaturized isothermal nucleic acid amplification, a review", *Lab On A Chip*, vol. 11, No. 8, Jan. 1, 2011, p. 1420, p. 1421, left col. p. 1423, right col.

M. Hashimoto, "On-line integration of PCR and cycle sequencing in capillaries: from human genomic DNA directly to called bases", *Nucleic Acids Research*, vol. 31, No. 8, Apr. 15, 2003, pp. 41e-41.

L. Zanoli et al., "Isothermal Amplification Methods for the Detection of Nucleic Acids in Microfluidic Devices", *Biosensors*, vol. 3, No. 1, Dec. 27, 2012, pp. 18-43.

EP Search Report dated Jul. 7, 2023 from EP Patent Application No. 20834193.3.

J.S. Gootenberg et al., "Nucleic Acid Detection with CRISPR-Cas13a/C2c2", *Science*, vol. 356(6336), pp. 438-442, 2017.

J.S. Gootenberg et al., "Multiplexed and Portable Nucleic Acid Detection Platform with Cas13, Cas12a, and Csm6", *Science*, vol. 360(6387), pp. 439-444, 2018.

J.S. Chen et al., "CRISPR-Cas12a Target Binding Unleashes Indiscriminate Single-Stranded DNase Activity", *Science*, vol. 360(6387), pp. 436-439, 2018.

International Search Report for International Application No. PCT/JP2020/026371, mailed Sep. 15, 2020.

R. Bruch et al., "CRISPR/Cas13a-Powered Electrochemical Microfluidic Biosensor for Nucleic Acid Amplification-Free miRNA Diagnostics", Advanced Materials, vol. 31, No. 51, Oct. 10, 2019.

Search Report dated Sep. 6, 2024 issued in EP Patent Appl. No. 21915214.7, (7 pages).

R. Watanabe et al., "Arrayed Lipid Bilayer Chambers Allow Single-Molecule Analysis of Membrane Transporter Activity.", Nature Communications, vol. 5, No. 4519, pp. 1-8, 2014.

H. Shinoda et al., "Amplification-Free RNA Detection with CRISPR-Cas13", Communications Biology, vol. 4, No. 476, pp. 1-7, Apr. 19, 2021, Supplementary Information.

R. Watanabe et al., "Rapid Digital Detection Technology for Novel Coronavirus", B&I, vol. 79, No. 5, pp. 427-429, Sep. 10, 2021.

International Search Report corresponding to PCT/JP2021/048095 dated Mar. 22, 2022. (English translation, 5 pages).

* cited by examiner

FIG. 9A
FIG. 9B
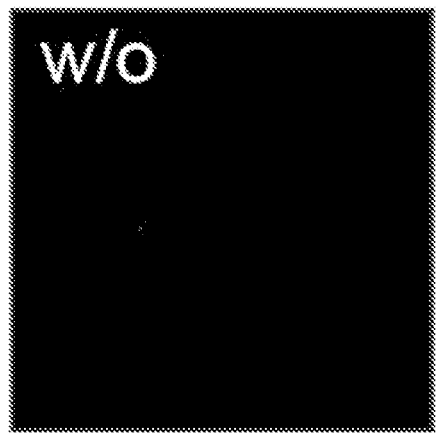
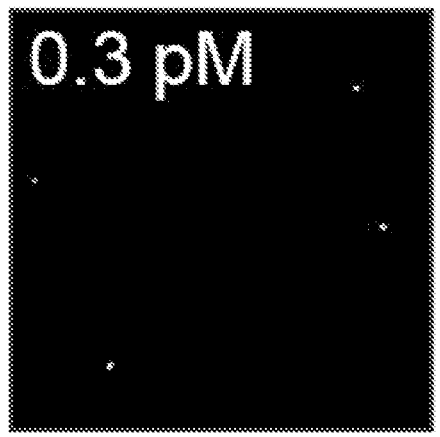
FIG. 9C
FIG. 9D
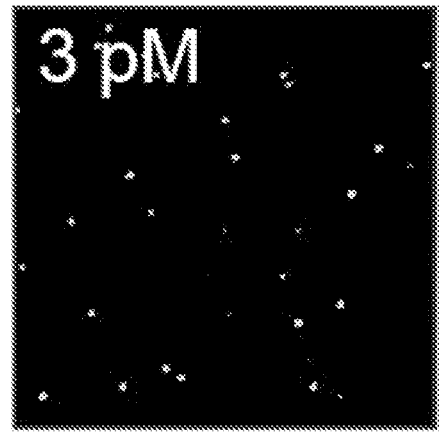
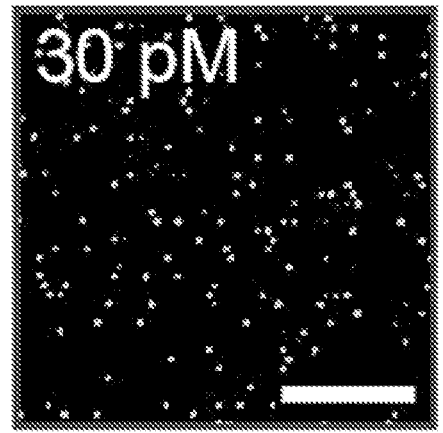

SEQUENCE LISTING

```
<160> NUMBER OF SEQ ID NOS: 6

<210> SEQ ID NO 1
<211> LENGTH: 20
<212> TYPE: DNA
<213> ORGANISM: Artificial Sequence
<220> FEATURE:
<223> OTHER INFORMATION: Synthesyzed oligonucleotide

<400> SEQUENCE: 1
gccaagcgca cctaatttcc                                              20

<210> SEQ ID NO 2
<211> LENGTH: 40
<212> TYPE: RNA
<213> ORGANISM: Artificial Sequence
<220> FEATURE:
<223> OTHER INFORMATION: Synthesyzed oligonucleotide

<400> SEQUENCE: 2
aauuucuacu aaguguagau ggaaauuagg ugcgcuuggc                         40

<210> SEQ ID NO 3
<211> LENGTH: 28
<212> TYPE: RNA
<213> ORGANISM: Artificial Sequence
<220> FEATURE:
<223> OTHER INFORMATION: Synthesyzed oligonucleotide

<400> SEQUENCE: 3
auggauuacu ugguagaaca gcaaucua                                     28
```

<210> SEQ ID NO 4
<211> LENGTH: 64
<212> TYPE: RNA
<213> ORGANISM: Artificial Sequence
<220> FEATURE:
<223> OTHER INFORMATION: Synthesyzed oligonucleotide

<400> SEQUENCE: 4

```
gauuuagacu accccaaaaa cgaaggggac uaaaacuaga uugcuguucu accaaguaau    60
ccau                                                                64
```

<210> SEQ ID NO 5
<211> LENGTH: 3005
<212> TYPE: DNA
<213> ORGANISM: Artificial Sequence
<220> FEATURE:
<223> OTHER INFORMATION: Synthesyzed oligonucleotide

<400> SEQUENCE: 5

```
aacgtcgtga ctgggaaaac cctggcgtta cccaacttaa tcgccttgca gcacatcccc    60
ctttcgccag ctggcgtaat agcgaagagg cccgcaccga tcgcccttcc caacagttgc   120
gcagcctgaa tggcgaatgg cgcctgatgc ggtattttct ccttacgcat ctgtgcggta   180
tttcacaccg catacgtcaa agcaaccata gtacgcgccc tgtagcggcg cattaagcgc   240
ggcgggtgtg gtggttacgc gcagcgtgac cgctacactt gccagcgccc tagcgcccgc   300
tcctttcgct ttcttccctt cctttctcgc cacgttcgcc ggctttcccc gtcaagctct   360
aaatcggggg ctccctttag ggttccgatt tagtgcttta cggcacctcg accccaaaaa   420
acttgatttg ggtgatggtt cacgtagtgg gccatcgccc tgatagacgg ttttcgccc    480 tttgacgttg gagtccacgt tctttaatag tggactcttg ttccaaactg gaacaacact   540
caaccctatc tcgggctatt cttttgattt ataagggatt ttgccgattt cggcctattg   600
gttaaaaaat gagctgattt aacaaaaatt taacgcgaat tttaacaaaa tattaacgtt   660
tacaatttta tggtgcactc tcagtacaat ctgctctgat gccgcatagt taagccagcc   720
ccgacacccg ccaacacccg ctgacgcgcc ctgacgggct tgtctgctcc ggcatccgc    780 ttacagacaa gctgtgaccg tctccgggag ctgcatgtgt cagaggtttt caccgtcatc   840
accgaaacgc gcgagacgaa agggcctcgt gatacgccta ttttatagg ttaatgtcat    900 gataataatg gtttcttaga cgtcaggtgg cacttttcgg ggaaatgtgc gcggaacccc   960
tatttgttta ttttctaaa tactttagga aattaggtgc gcttggcaac cattcaaata  1020
tgtatccgct catgagacaa taaccctgat aaatgcttca ataatattga aaaggaaga   1080 gtatgagtat tcaacatttc cgtgtcgccc ttattccctt ttttgcggca ttttgccttc   1140 ctgttttgc tcacccagaa acgctggtga agtaaaaga tgctgaagat cagttgggtg    1200
cacgagtggg ttacatcgaa ctggatctca acagcggtaa gatccttgag agttttcgcc   1260
ccgaagaacg ttttccaatg atgagcactt ttaaagttct gctatgtggc gcggtattat  1320
cccgtattga cgccgggcaa gagcaactcg gtcgccgcat acactattct cagaatgact  1380
tggttgagta ctcaccagtc acagaaaagc atcttacgga tggcatgaca gtaagagaat  1440
tatgcagtgc tgccataacc atgagtgata acactgcggc caacttactt ctgacaacga  1500
tcggaggacc gaaggagcta accgcttttt tgcacaacat ggggatcat gtaactcgcc   1560 ttgatcgttg ggaaccggag ctgaatgaag ccataccaaa cgacgagcgt gacaccacga  1620
tgcctgtagc aatggcaaca acgttgcgca aactattaac tggcgaacta cttactctag  1680
```

```
cttcccggca acaattaata gactggatgg aggcggataa agttgcagga ccacttctgc    1740
gctcggccct tccggctggc tggtttattg ctgataaatc tggagccggt gagcgtgggt    1800
ctcgcggtat cattgcagca ctggggccag atggtaagcc ctcccgtatc gtagttatct    1860
acacgacggg gagtcaggca actatggatg aacgaaatag acagatcgct gagataggtg    1920
cctcactgat taagcattgg taactgtcag accaagttta ctcatatata ctttagattg    1980
atttaaaact tcattttaa tttaaaagga tctaggtgaa gatccttttt gataatctca    2040
tgaccaaaat cccttaacgt gagttttcgt tccactgagc gtcagacccc gtagaaaaga    2100
tcaaaggatc ttcttgagat ccttttttc tgcgcgtaat ctgctgcttg caaacaaaaa    2160
aaccaccgct accagcggtg gtttgtttgc cggatcaaga ctaccaact cttttccga     2220 aggtaactgg cttcagcaga gcgcagatac caaatactgt ccttctagtg tagccgtagt    2280
taggccacca cttcaagaac tctgtagcac cgcctacata cctcgctctg ctaatcctgt    2340
taccagtggc tgctgccagt ggcgataagt cgtgtcttac cgggttggac tcaagacgat    2400
agttaccgga taaggcgcag cggtcgggct gaacggggg ttcgtgcaca cagcccagct    2460
tggagcgaac gacctacacc gaactgagat acctacagcg tgagctatga gaaagcgcca    2520
cgcttcccga agggagaaag gcggacaggt atccggtaag cggcagggtc ggaacaggag    2580
agcgcacgag ggagcttcca gggggaaacg cctggtatct ttatagtcct gtcgggtttc    2640
gccacctctg acttgagcgt cgatttttgt gatgctcgtc aggggggcgg agcctatgga    2700
aaaacgccag caacgcggcc ttttacggt tcctggcctt ttgctggcct tttgctcaca    2760
tgttctttcc tgcgttatcc cctgattctg tggataaccg tattaccgcc tttgagtgag    2820
ctgataccgc tcgccgcagc cgaacgaccg agcgcagcga gtcagtgagc gaggaagcgg    2880
aagagcgccc aatacgcaaa ccgcctctcc ccgcgcgttg gccgattcat taatgcagct    2940
ggcacgacag gtttcccgac tggaaagcgg gcagtgagcg caacgcaatt aatgtgagtt    3000
agctc                                                              3005
```

<210> SEQ ID NO 6
<211> LENGTH: 120
<212> TYPE: RNA
<213> ORGANISM: Artificial Sequence
<220> FEATURE:
<223> OTHER INFORMATION: Synthesyzed oligonucleotide

<400> SEQUENCE: 6

```
gggggccagu gaauucgagc ucgguacccg gggauccucu agaaauaugg auuacuuggu    60
agaacagcaa ucuacucgac cugcaggcau gcaagcuugg cguaaucaug gucauagcug   120
```

METHOD AND KIT FOR DETECTING TARGET NUCLEIC ACID FRAGMENT

TECHNICAL FIELD

The present invention relates to a method and a kit for detecting a target nucleic acid fragment. Priority is claimed on Japanese Patent Application No. 2019-125564, filed Jul. 4, 2019, the content of which is incorporated herein by reference.

BACKGROUND ART

There is a demand for a technology for detecting a target nucleic acid fragment in a sample with high sensitivity. For example, it is known that free DNA released from cells (cell-free DNA, cfDNA) due to cell death exists in blood. The cfDNA of cancer patients also includes blood-circulating tumor DNA (circulating tumor DNA, ctDNA), which is DNA derived from cancer cells.

Furthermore, there is a demand for testing whether a causative virus of an infectious disease is present in a sample such as a throat swab or a nasal swab of a test subject.

It is also known that various cells secrete membrane vesicles called exosomes, and that exosomes are included in biological samples such as saliva, blood, urine, amniotic fluid, and malignant ascites, and in a supernatant of cultured cells. Exosomes include various proteins, lipids, microRNAs, DNAs, and the like derived from the cells that secrete those exosomes.

In recent years, research has been conducted on detecting cfDNA as well as microRNA, DNA, and the like in membrane vesicles such as exosomes, and applying the detection results to early detection of cancer and various other diseases, prediction of effects of anticancer agents, predisposition diagnosis of diseases, diagnosis of hereditary diseases, and the like. A technology for detecting a target nucleic acid fragment in a sample with high sensitivity can be applied, as an example, to such a field.

The acquired immune mechanism discovered in prokaryotes is called the CRISPR/Cas system and has been applied to genome editing in recent years. There are a plurality of families of CRISPR/Cas proteins. It has been found that among the CRISPR/Cas protein families, Cas12 and Cas13 form a tripartite complex with crRNA and a target nucleic acid, and when the target nucleic acid is cleaved, Cas12 and Cas13 express an activity of cleaving a DNA or RNA in the surroundings. For example, in Non-Patent Documents 1 to 3, methods for detecting a target nucleic acid fragment with high sensitivity by utilizing such activity of Cas12 and Cas13 have been reported.

CITATION LIST

Gootenberg J. S., et al., Nucleic acid detection with CRISPR-Cas13a/C2c2, Science, 356 (6336), 438-442, 2017.
Gootenberg J. S., et al., Multiplexed and portable nucleic acid detection platform with Cas13, Cas12a, and Csm6, Science, 360 (6387), 439-444, 2018.
Chen J. S., et al., CRISPR-Cas12a target binding unleashes indiscriminate single-stranded DNase activity, Science, 360 (6387), 436-439, 2018.

SUMMARY OF THE INVENTION

Technical Problem

However, the methods described in the above non-patent documents require a step of amplifying a target nucleic acid fragment. Thus, an object of the present invention is to provide a technology capable of detecting a target nucleic acid fragment with high sensitivity without amplifying the target nucleic acid fragment.

Solution to Problem

The present invention includes the following embodiments.

[1] A method for detecting a target nucleic acid fragment in a sample, the method including:
a step of bringing the sample into contact with a gRNA complementary to the target nucleic acid fragment, a CRISPR/Cas family protein, and a substrate nucleic acid fragment, in which
the CRISPR/Cas family protein expresses nuclease activity after forming a tripartite complex with the gRNA and the target nucleic acid fragment,
the substrate nucleic acid fragment is labeled with a fluorescent substance and a quenching substance, and when the substrate nucleic acid fragment is cleaved by the nuclease activity of the tripartite complex so that the fluorescent substance is separated from the quenching substance, the fluorescent substance emits fluorescence upon being irradiated with excitation light, and
the contact is performed in a reaction space having a volume of 10 aL to 100 pL so that when the target nucleic acid fragment is present in the sample, the tripartite complex is formed, the substrate nucleic acid fragment is cleaved, and the fluorescent substance is separated from the quenching substance; and
a step of irradiating the fluorescent substance with the excitation light and detecting the fluorescence,
in which detection of the fluorescence indicates that the target nucleic acid fragment is present in the sample.

[2] The method according to [1], in which the CRISPR/Cas family protein is a Cas12 protein or a Cas13 protein.

[3] The method according to [1] or [2], in which 0 molecules or 1 molecule of the target nucleic acid fragment is introduced into each reaction space.

[4] The method according to any one of [1] to [3], in which the reaction space is a well formed on a baseplate.

[5] The method according to [4], in which the CRISPR/Cas family protein is immobilized on an inner surface of the well.

[6] A kit for detecting a target nucleic acid fragment, the kit including:
a baseplate having a well having a volume of 10 aL to 100 pL and formed on a surface;
a gRNA complementary to the target nucleic acid fragment;
a CRISPR/Cas family protein; and
a substrate nucleic acid fragment,
in which the CRISPR/Cas family protein expresses nuclease activity after forming a tripartite complex with the gRNA and the target nucleic acid fragment,
the substrate nucleic acid fragment is labeled with a fluorescent substance and a quenching substance, and when the substrate nucleic acid fragment is cleaved by the nuclease activity of the tripartite complex so that the fluorescent substance is separated from the quenching substance, the fluorescent substance emits fluorescence upon being irradiated with excitation light.

[7] The kit according to [6], in which the CRISPR/Cas family protein is a Cas12 protein or a Cas13 protein.

[8] The kit according to [6] or [7], in which the CRISPR/Cas family protein is immobilized on an inner surface of the well.

[9] The kit according to any one of [6] to [8], in which the gRNA is immobilized on an inner surface of the well.

Advantageous Effects of Invention

According to the present invention, a technology capable of detecting a target nucleic acid fragment with high sensitivity without amplifying the target nucleic acid fragment can be provided.

BRIEF DESCRIPTION OF THE DRAWINGS

FIG. 9A is a representative fluorescence micrograph showing the results of Experimental Example 4.

FIG. 9B is a representative fluorescence micrograph showing the results of Experimental Example 4.

FIG. 9C is a representative fluorescence micrograph showing the results of Experimental Example 4.

FIG. 9D is a representative fluorescence micrograph showing the results of Experimental Example 4.

DETAILED DESCRIPTION OF THE PREFERRED EMBODIMENTS

Figure 1A:
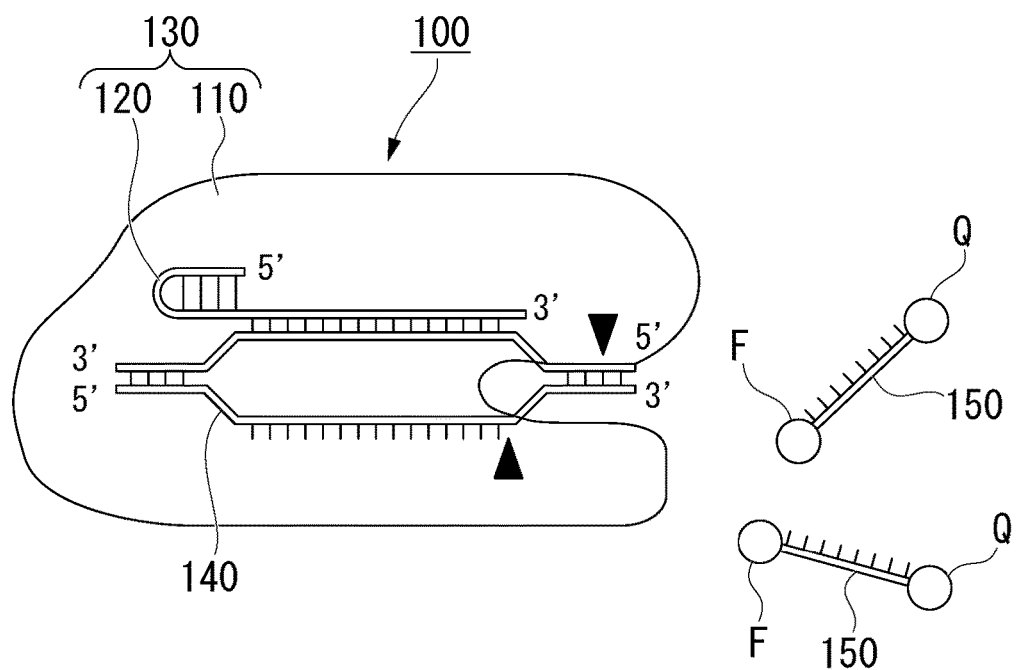
FIG. 1A is a schematic diagram explaining a method for detecting a target nucleic acid fragment.

Hereinafter, embodiments of the present invention will be described in detail, with reference to the drawings depending on circumstances. In the drawings, the same or equivalent portions will be assigned with the same or corresponding reference numerals, and any overlapping description will be omitted. The dimensional ratio in each diagram has some portions exaggerated for explanation and does not necessarily match the actual dimensional ratio.

Method for Detecting Target Nucleic Acid Fragment

According to an embodiment, the present invention provides a method for detecting a target nucleic acid fragment in a sample, the method including a step of bringing the sample into contact with a gRNA complementary to the target nucleic acid fragment, a CRISPR/Cas family protein, and a substrate nucleic acid fragment; and a step of irradiating the substrate nucleic acid fragment with excitation light and detecting fluorescence, in which detection of the fluorescence indicates that the target nucleic acid fragment is present in the sample.

In the method of the present embodiment, the CRISPR/Cas family protein expresses nuclease activity after forming a tripartite complex with the gRNA and the target nucleic acid fragment. Furthermore, the substrate nucleic acid fragment is labeled with a fluorescent substance and a quenching substance, and when the substrate nucleic acid fragment is cleaved by the nuclease activity of the above-mentioned tripartite complex so that the fluorescent substance is separated from the quenching substance, the fluorescent substance emits fluorescence upon being irradiated with excitation light. In addition, the contact of the sample, gRNA, CRISPR/Cas family protein and substrate nucleic acid fragment is carried out in a reaction space having a volume of 10 aL to 100 pL.

As a result, when the target nucleic acid fragment is present in the sample, the above-mentioned tripartite complex is formed, the substrate nucleic acid fragment is cleaved, and the fluorescent substance is separated from the quenching substance. Then, when excitation light is irradiated, fluorescence is detected.

Figure 1B:
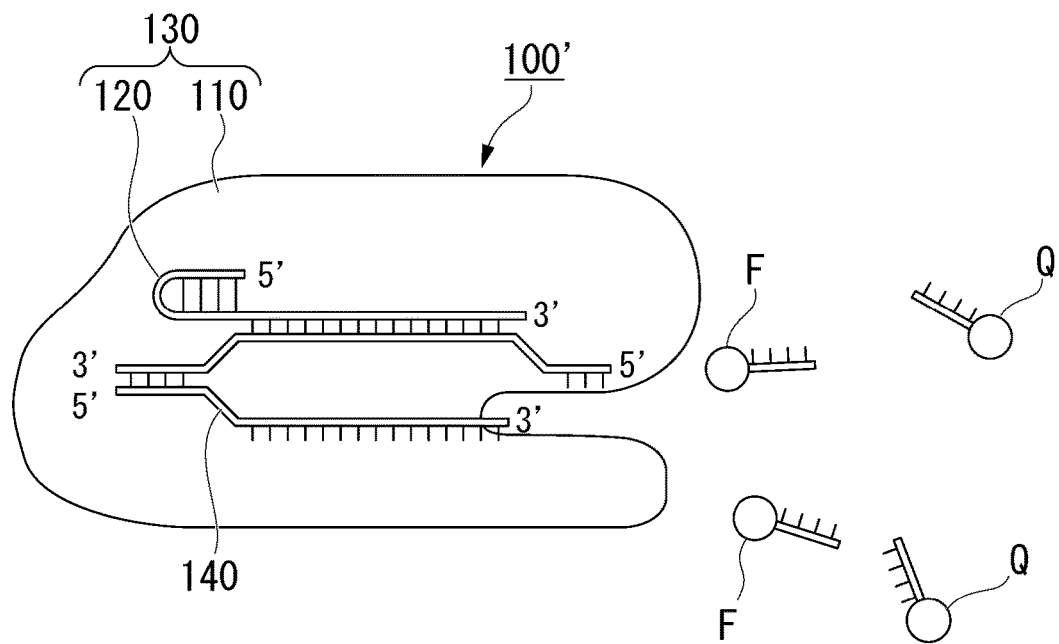
FIG. 1B is a schematic diagram explaining a method for detecting a target nucleic acid fragment.

FIG. 1A and FIG. 1B are schematic diagrams explaining the method of the present embodiment. In FIG. 1A and FIG. 1B, a case where the CRISPR/Cas family protein is a Cas12a protein will be described as an example.

First, as shown in FIG. 1A, when Cas12a protein 110 and gRNA 120 are brought into contact with each other, these bind to each other to form a bipartite complex 130. The gRNA 120 partly has a base sequence complementary to the target nucleic acid fragment 140.

Subsequently, when the target nucleic acid fragment 140 in the sample comes into contact with the bipartite complex 130, the Cas12a protein 110, the gRNA 120, and the target nucleic acid fragment 140 form a tripartite complex 100. At this stage, the Cas12a protein 110 does not express nuclease activity, and therefore, the substrate nucleic acid fragment 150 is not cleaved. In the example of FIG. 1A and FIG. 1B, the substrate nucleic acid fragment 150 is a single-stranded DNA fragment labeled with a fluorescent substance F and a quenching substance Q. No fluorescence is generated even when the substrate nucleic acid fragment 150 is irradiated with excitation light.

When the tripartite complex 100 is formed, the Cas12a protein 110 cleaves a target site of the target nucleic acid fragment 140. In FIG. 1A, target sites of the target nucleic acid fragment 140 are indicated by arrowheads. FIG. 1B is a schematic diagram showing a tripartite complex 100' in which the target sites of the target nucleic acid fragment 140 have been cleaved. As shown in FIG. 1B, the tripartite complex 100' expresses nuclease activity. Then, substrate nucleic acid fragments 150 that are present around the tripartite complex 100' are cleaved. As a result, the fluorescent substance F of the substrate nucleic acid fragment 150 is separated from the quenching substance Q. The fluorescent substance F separated from the quenching substance Q emits fluorescence upon being irradiated with excitation light.

Subsequently, the fluorescent substance F is irradiated with excitation light, and fluorescence is detected. When fluorescence is detected, it can be determined that the target nucleic acid fragment 140 has been present in the sample.

According to the method of the present embodiment, the sample, the gRNA 120, the CRISPR/Cas family protein 110, and the substrate nucleic acid fragment 150 may be mixed in any order and brought into contact.

For example, first, the gRNA 120 and the CRISPR/Cas family protein 110 may be brought into contact with each other to form the bipartite complex 130 in advance, and then the sample may be brought into contact with the bipartite complex 130. In this case, when the target nucleic acid fragment 140 is present in the sample, the target nucleic acid fragment 140 binds to the bipartite complex 130, and the tripartite complex 100 is formed. Subsequently, the substrate nucleic acid fragment 150 may be brought into contact therewith.

Alternatively, after forming the bipartite complex 130, the target nucleic acid fragment 140 and the substrate nucleic acid fragment 150 may be simultaneously brought into contact with each other.

Alternatively, the gRNA 120, the CRISPR/Cas family protein 110, and the sample may be simultaneously brought into contact. Even in this case, when the target nucleic acid fragment 140 is present in the sample, the tripartite complex 100 is finally formed. Subsequently, the substrate nucleic acid fragment 150 may be brought into contact therewith.

Alternatively, the sample, the gRNA 120, the CRISPR/Cas family protein 110, and the substrate nucleic acid fragment 150 may be simultaneously brought into contact. Even in this case, when the target nucleic acid fragment 140 is present in the sample, the tripartite complex 100 is finally formed, and when a target site of the target nucleic acid fragment 140 in the tripartite complex 100 is cleaved, the tripartite complex 100 is converted to a tripartite complex 100', expresses nuclease activity, and cleaves the substrate nucleic acid fragment 150.

Sample

The sample is not particularly limited and can be appropriately selected according to the purpose, and examples include biological samples such as saliva, blood, urine, amniotic fluid, malignant ascites, throat swab, and nasal swab; and a supernatant of cultured cells.

Target Nucleic Acid Fragment

Examples of the target nucleic acid fragment in the sample include a cfDNA, a ctDNA, a microRNA, and an exosome-derived DNA, as mentioned above. For example, by using a nucleic acid fragment including a hotspot region of an oncogene as a target nucleic acid fragment, a mutation of the oncogene included in the sample can be detected.

When the CRISPR/Cas family protein is a Cas12 protein, a double-stranded DNA fragment can be detected as a target nucleic acid fragment. When the CRISPR/Cas family protein is a Cas13 protein, a single-stranded RNA fragment or a single-stranded DNA fragment can be detected as a target nucleic acid fragment.

gRNA

In the method of the present embodiment, the guide RNA (gRNA) is not particularly limited as long as it can be used for the CRISPR/Cas family protein to be used, and the gRNA may be a complex with a CRISPR RNA (crRNA) and a trans-activated type CRISPR RNA (tracrRNA), may be a single gRNA (sgRNA) combining a tracrRNA and a crRNA, or may be only a crRNA.

When the CRISPR/Cas family protein to be used is a Cas12a protein, the crRNA can have, for example, the following base sequence. First, a base sequence obtained by removing the protospacer adjacent motif (PAM) sequence from the target base sequence is used as a spacer base sequence. Subsequently, a base sequence in which a scaffold sequence is linked to the 3'-terminus of the spacer base sequence is designed, and a complementary strand thereof is used as the base sequence of the crRNA.

For example, when the base sequence obtained by removing the PAM sequence from the target base sequence is "5'-GCCAAGCGCACCTAATTTCC-3'" (SEQ ID NO:1), the base sequence of the crRNA for the Cas12a protein can be made as "5'-AAUUUCUACUAAGUGUAGAUG-GAAAUUAGGUGCGCUUGGC-3'" (SEQ ID NO:2).

When the CRISPR/Cas family protein to be used is a Cas13a protein, the crRNA can have, for example, the following base sequence. First, a base sequence in which a scaffold sequence is linked to the 3'-terminus of a base sequence complementary to the target base sequence is designed, and a complementary strand thereof is used as the base sequence of the crRNA.

For example, when the target base sequence is

"5'-AUGGAUUACUUGGUAGAACAGCAAUCUA-3'" (SEQ ID NO:

3), the base sequence of the crRNA for the Cas13a protein can be made as "5'-GAUUUAGACUACCCCAAAAACG

AAGGGGACUAAAACUAGAUUGCUGUUCUACCAAGUAAUCCAUG-3'"

(SEQ ID NO: 4).

The target base sequence is a partial base sequence of the base sequence of the target nucleic acid fragment. At least one kind of target base sequence is set in one kind of target nucleic acid fragment. By setting a plurality of kinds of target base sequences in one kind of target nucleic acid fragment, a tripartite complex of a plurality of molecules can be formed on one molecule of the target nucleic acid fragment.

That is, by using a plurality of kinds of gRNA for one kind of target nucleic acid fragment, the number of molecules of the tripartite complex to be formed on one molecule of the target nucleic acid fragment can be increased. As a result, the number of molecules of the tripartite complex expressing nuclease activity per molecule of the target nucleic acid fragment can be increased, and the detection sensitivity for the target nucleic acid fragment can be further increased.

Therefore, according to one embodiment, the present invention provides a method for increasing the detection sensitivity in the above-mentioned method for detecting a target nucleic acid fragment, the method including a step of forming a tripartite complex of a plurality of molecules on one molecule of target nucleic acid fragment by using a plurality of kinds of gRNA.

CRISPR/Cas Family Protein

In the method of the present embodiment, as the CRISPR/Cas family protein, any one that expresses nuclease activity after forming a tripartite complex with a gRNA and a target nucleic acid fragment can be used. As mentioned above, more accurately, the CRISPR/Cas family protein expresses nuclease activity after a tripartite complex is formed and the CRISPR/Cas family protein cleaves the target nucleic acid fragment.

Examples of such a CRISPR/Cas family protein include a Cas12 protein and a Cas13 protein. In the present specification, the Cas12 protein and the Cas13 protein may be Cas12 proteins, Cas13 proteins, orthologs of these proteins, modified bodies of these proteins, and the like.

More specific examples of the CRISPR/Cas family protein that can be used for the method of the present embodiment include a Cas12a protein derived from Lachnospiraceae bacterium ND2006 (LbCas12a, UniProtKB Accession No.: A0A182DWE3), a Cas12a protein derived from Acidaminococcus sp. (AsCas12a, UniProtKB Accession No.: U2UMQ6), a Cas12a protein derived from *Francisella tularensis* subsp. *novicida* (FnCas12a, UniProtKB Accession No.: A0Q7Q2), a Cas12b protein derived from *Alicyclobacillus acidoterrestris* (AaCas12b, UniProtKB Accession No.: T0D7A2), a Cas13a protein derived from *Leptotrichia wadei* (LwaCas13a, NCBI Accession No.: WP_021746774.1), a Cas13a protein derived from Lachnospiraceae bacterium NK4A179 (LbaCas13a, NCBI Accession No.: WP_022785443.1), a Cas13a protein derived from *Leptotrichia buccalis* C-1013-b (LbuCas13a, NCBI Accession No.: WP_015770004.1), a Cas13b protein derived from *Bergeyella zoohelcum* (BzoCas13b, NCBI Accession No.: WP_002664492), a Cas13b protein derived from *Prevotella intermedia* (PinCas13b, NCBI Accession No.: WP_036860899), a Cas13b protein derived from *Prevotella buccae* (PbuCas13b, NCBI Accession No.: WP_004343973), a Cas13b protein derived from *Alistipes* sp. ZOR0009 (AspCas13b, NCBI Accession No.: WP_047447901), a Cas13b protein derived from *Prevotella* sp. MA2016 (PsmCas13b, NCBI Accession No.: WP_036929175), a Cas13b protein derived from *Riemerella anatipestifer* (RanCas13b, NCBI Accession No.: WP_004919755), a Cas13b protein derived from *Prevotella aurantiaca* (PauCas13b, NCBI Accession No.: WP_025000926), a Cas13b protein derived from *Prevotella saccharolytica* (PsaCas13b, NCBI Accession No.: WP_051522484), a Cas13b protein derived from *Prevotella intermedia* (Pin2Cas13b, NCBI Accession No.: WP_061868553), a Cas13b protein derived from *Capnocytophaga canimorsus* (CcaCas13b, NCBI Accession No.: WP_013997271), a Cas13b protein derived from *Porphyromonas gulae* (PguCas13b, NCBI Accession No.: WP_039434803), a Cas13b protein derived from *Prevotella* sp. P5-125 (PspCas13b, NCBI Accession No.: WP_044065294), a Cas13b protein derived from *Porphyromonas gingivalis* (PigCas13b, NCBI Accession No.: WP_053444417), a Cas13b protein derived from *Prevotella intermedia* (Pin3Cas13b, NCBI Accession No.: WP_050955369), a Csm6 protein derived from *Enterococcus italicus* (EiCsm6, NCBI Accession No.: WP_007208953.1), a Csm6 protein derived from *Lactobacillus salivarius* (LsCsm6, NCBI Accession No.: WP_081509150.1), and a Csm6 protein derived from *Thermus thermophilus* (TtCsm6, NCBI Accession No.: WP_011229148.1).

According to the method of the present embodiment, the CRISPR/Cas family protein may be a mutant of the Cas family protein described above. As the mutant, for example, a mutant having increased nuclease activity after forming a tripartite complex can be used.

Substrate Nucleic Acid Fragment

The substrate nucleic acid fragment is labeled with a fluorescent substance and a quenching substance, and when the substrate nucleic acid fragment is cleaved by the nuclease activity of the tripartite complex so that the fluorescent substance is separated from the quenching substance, the fluorescent substance emits fluorescence upon being irradiated with excitation light.

The substrate nucleic acid fragment may be appropriately selected according to the substrate specificity of the CRISPR/Cas family protein to be used. For example, a Cas12 protein cleaves a single-stranded DNA as a substrate. Thus, when a Cas12 protein is used, a single-stranded DNA may be used as the substrate nucleic acid fragment. Furthermore, a Cas13 protein cleaves a single-stranded RNA as a substrate. Thus, when a Cas13 protein is used, a single-stranded RNA may be used as the substrate nucleic acid fragment.

Regarding the combination of the fluorescent substance and the quenching substance, a combination that can quench the fluorescence of the fluorescent substance when the substances are brought close to each other is used. For example, when FAM, HEX, or the like is used as the fluorescent substance, Iowa Black FQ (IDT, Inc.), TAMRA, or the like can be used as the quenching substance.

Meanwhile, it is known that the base sequence of the single-stranded RNA to be cleaved has specificity depending on the type of the Cas13 protein. Specifically, for example, it has been reported that LwaCas13a protein, CcaCas13b protein, LbaCas13a protein, and PsmCas13b protein recognize and cleave the base sequences of AU, UC, AC, and GA, respectively, in the substrate nucleic acid fragment.

Thus, in the method of the present embodiment, for example, when LwaCas13a protein, CcaCas13b protein, LbaCas13a protein, and PsmCas13b protein are used as the CRISPR/Cas family proteins, different gRNAs are each bonded to each of the CRISPR/Cas family proteins as the gRNA, a single-stranded RNA including the base sequences of AU, UC, AC, and GA is used as the substrate nucleic acid fragment, and further each substrate nucleic acid fragment is further labeled with different fluorescent dyes that can be distinguished from each other, four kinds of target nucleic acid fragments can be detected in one reaction space. That is, multicolor detection can be carried out.

Reaction Space

As a technique for accurately detecting a target substance, technologies for performing an enzymatic reaction in a large number of minute reaction spaces have been investigated. These techniques are called digital measurement. In digital measurement, a sample is divided into a large number of minute reaction spaces to detect signals.

Then, the signal from each reaction space is binarized, only the presence or absence of the target substance is determined, and thereby the number of molecules of the target substance is measured. According to the digital measurement, the detection sensitivity and quantitatively can be remarkably enhanced as compared to the conventional ELISA, the real-time PCR method, and the like.

The method of the present embodiment is carried out by digital measurement. More specifically, the contact of a sample, a CRISPR/Cas family protein, a gRNA, and a substrate nucleic acid fragment is carried out dividedly in minute reaction spaces. The volume per reaction space is 10 aL to 100 pL, may be 10 aL to 10 pL for example, may be 10 aL to 1 pL for example, may be 10 aL to 100 fL for example, or may be 10 aL to 10 fL for example. When the reaction space is in the above-described range, the presence of the target nucleic acid fragment can be detected with high sensitivity, even without amplifying the target nucleic acid fragment.

Digital measurement can be performed by the method of the present embodiment under conditions in which 0 molecules or 1 molecule of the target nucleic acid fragment is introduced per reaction space. That is, the number of the reaction spaces in which a signal is detected can be made to correspond with the number of molecules of the target nucleic acid fragment in the sample.

Figure 2A:
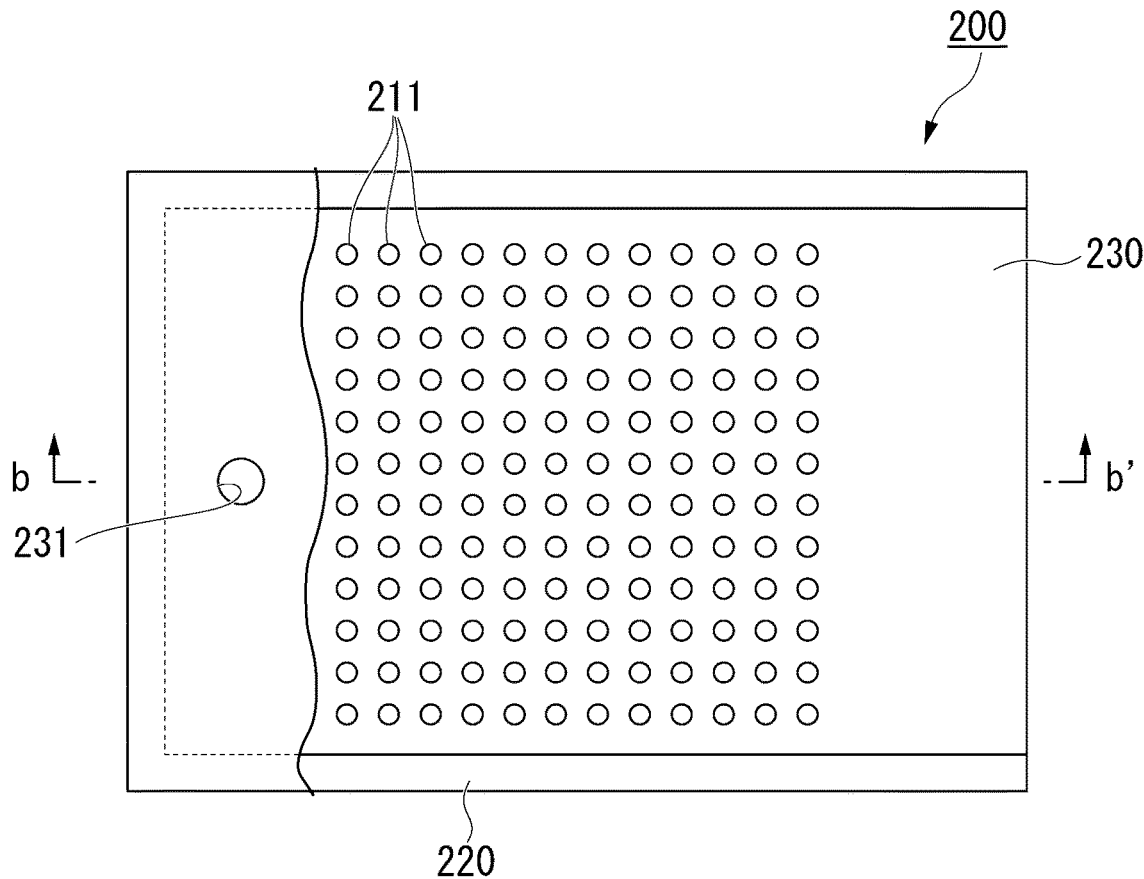
FIG. 2A is a top view showing an example of a fluid device.
Figure 2B:
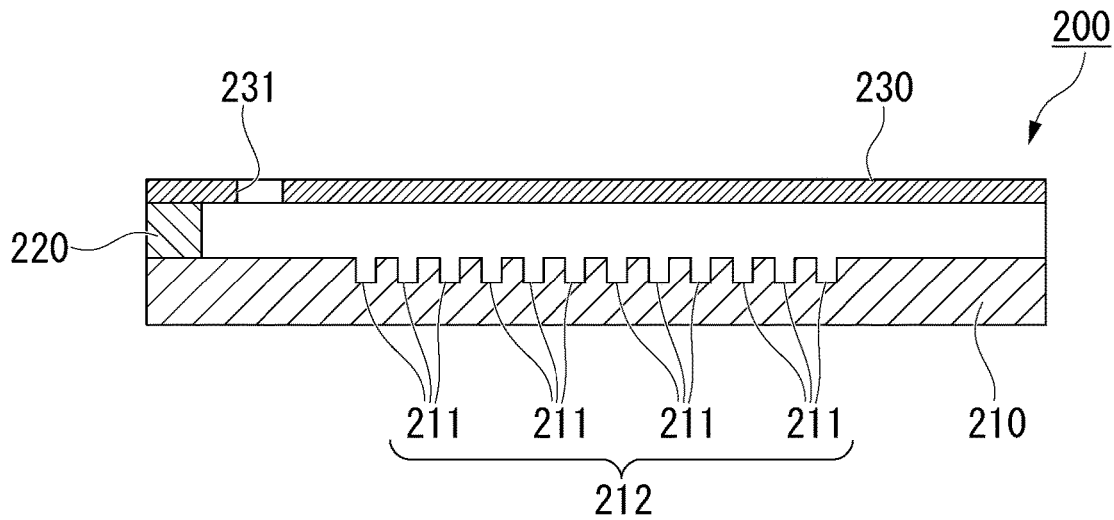
FIG. 2B is a cross-sectional view taken along the line b-b' of FIG. 2A in the arrow direction.

The reaction space may be, for example, a liquid droplet. Alternatively, the reaction space may be a well formed on a baseplate. FIG. 2A is a top view showing an example of a fluid device provided with a baseplate having wells with a volume per one well of 10 aL to 100 pL formed on the surface. FIG. 2B is a cross-sectional view taken along the line b-b' of FIG. 2A in the arrow direction.

As shown in FIG. 2A and FIG. 2B, the fluid device 200 has a baseplate 210 in which wells 211 each having a volume of 10 aL to 100 pL are formed on the surface; a spacer 220; and a lid member 230 forming a liquid inlet port 231. There are a plurality of wells 211 forming a well array 212. The space between the baseplate 210 and the lid member 230 functions as a flow channel through which a sample, a gRNA, a CRISPR/Cas family protein, a substrate nucleic acid fragment, and the like are caused to flow.

Regarding the wells, their shape is not particularly limited as long as the volume is within the above-mentioned range, and the shape may be, for example, a cylinder shape or a polyhedron composed of a plurality of faces (for example, a rectangular parallelepiped, a hexagonal column, or an octagonal column).

In the fluid device 200, a plurality of wells 211 having the same shape and the same size form the well array 212. The same shape and the same size may be the same shape and the same capacity to the extent required for digital measurement, and variations in the degree of manufacturing error are allowed.

Figure 3A:
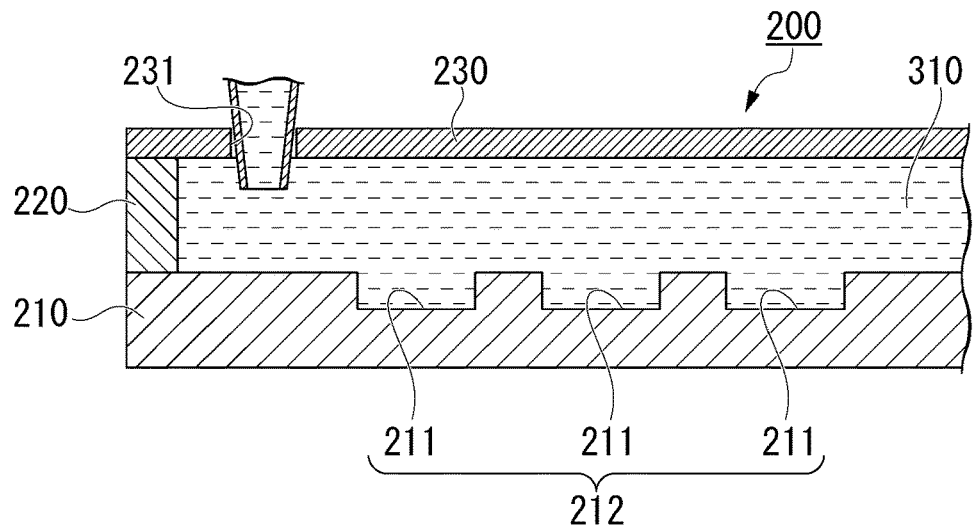
FIG. 3A is a schematic cross-sectional view explaining an example of a procedure for carrying out the method of the present embodiment.
Figure 3B:
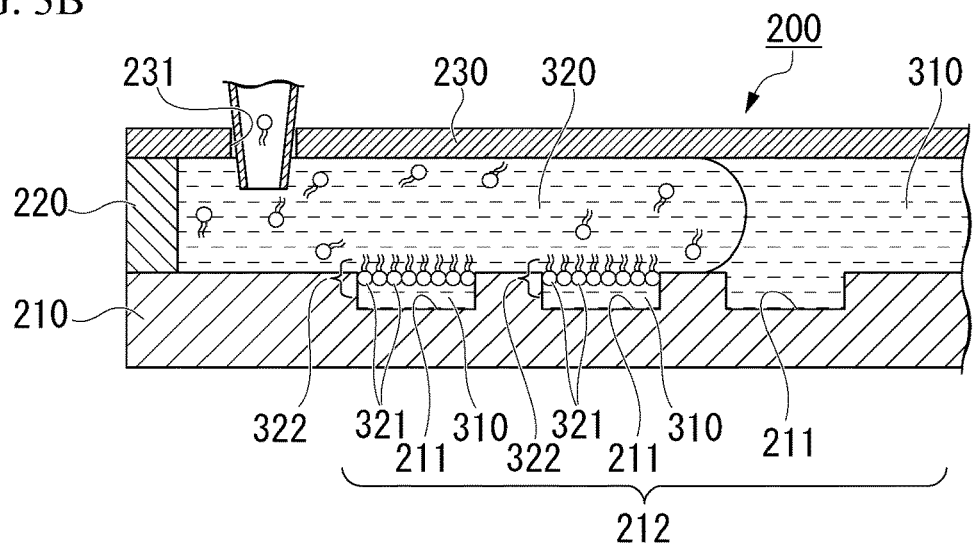
FIG. 3B is a schematic cross-sectional view explaining an example of a procedure for carrying out the method of the present embodiment.
Figure 3C:
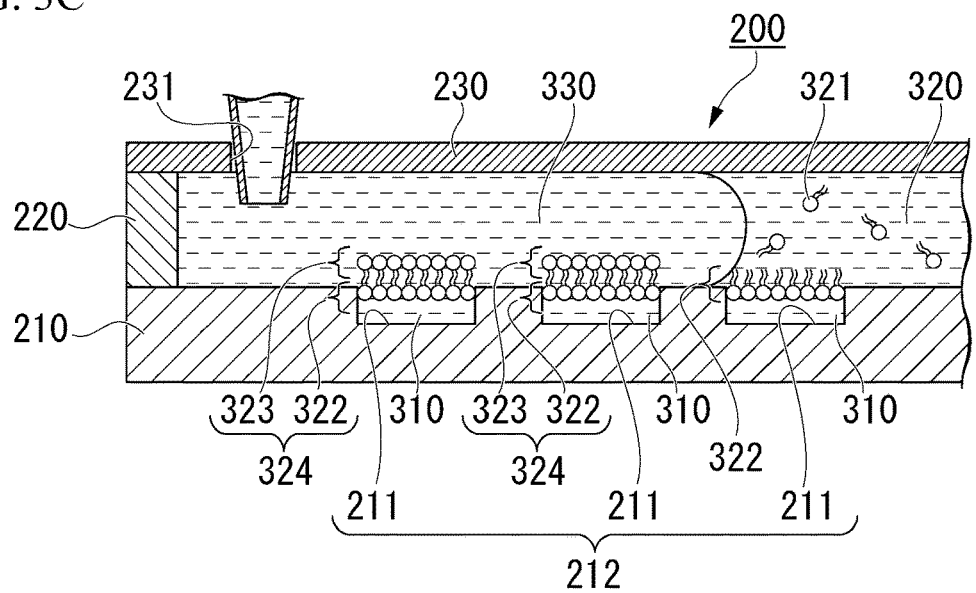
FIG. 3C is a schematic cross-sectional view explaining an example of a procedure for carrying out the method of the present embodiment.

FIG. 3A to FIG. 3C are schematic cross-sectional views explaining an example of a procedure for carrying out the method of the present embodiment using the fluid device 200. First, a sample, gRNA, and a CRISPR/Cas family protein are mixed, and a tripartite complex is formed. Subsequently, the tripartite complex and a substrate nucleic acid fragment are mixed to prepare an assay solution 310, and the assay solution 310 is immediately introduced through the liquid inlet port 231 of the fluid device 200. As a result, as shown in FIG. 3A, the spaces inside the wells 211 and between the baseplate 210 and the lid member 230 are filled with the assay solution 310.

Subsequently, as shown in FIG. 3B, a sealant 320 is introduced through the liquid inlet port 231. In the example of FIG. 3B, an organic solvent containing lipid 321 is used as the sealant 320. As the lipid 321, natural lipids derived from soybean, *Escherichia coli*, and the like; and artificial lipids such as dioleoylphosphatidylethanolamine (DOPE) and dioleoylphosphatidylglycerol (DOPG) can be used. Hexadecane or chloroform can be used as the organic solvent. When the sealant 320 is introduced, the openings of the wells 211 are sealed by a first lipid membrane 322 in a state in which the inside of the wells 211 is filled with the assay solution 310. The hydrophilic group of each lipid 321 constituting the first lipid membrane 322 faces the well 211 side. As a result, each well 211 becomes an independent reaction space. In this state, the well array 212 may be irradiated with excitation light to measure fluorescence.

Furthermore, a lipid membrane may be further laminated on the first lipid membrane 322, and a lipid bilayer membrane may be formed. In this case, as shown in FIG. 3C, an aqueous solution for membrane formation 330 for forming a lipid bilayer membrane 324 is introduced through the liquid inlet port 231. Regarding the composition of the aqueous solution for membrane formation 330, for example, a 10 mM pH buffer solution (pH 5 to 9), a 10 mM aqueous solution of sodium chloride, or the like can be used. When the aqueous solution for membrane formation 330 is introduced, a second lipid membrane 323 is laminated on the first lipid membrane 322, and a lipid bilayer membrane 324 is formed. As a result, each well 211 becomes an independent reaction space. In this state, the well array 212 may be irradiated with excitation light to measure fluorescence.

When the openings of the wells 211 are encapsulated with the lipid bilayer membrane 324, lipid vesicles can be fused with the lipid bilayer membrane 324. For example, by fusing exosomes with the lipid bilayer membrane 324, the contents of the exosomes can be released into the wells 211.

Thus, for example, a gRNA, a CRISPR/Cas family protein, and a substrate nucleic acid fragment are first encapsulated in a well 211, the opening of the well 211 is sealed with a lipid bilayer membrane 324, and then exosomes as a sample may be brought into contact with the lipid bilayer membrane 324.

As a result, the exosomes fuse with the lipid bilayer membrane 324, and the contents of the exosomes are released into the well 211. When a target nucleic acid fragment is present in the contents of the exosomes, a tripartite complex is formed inside the well 211, the substrate nucleic acid fragment is cleaved, and fluorescence is detected as a result of irradiation with excitation light.

Figure 4A:
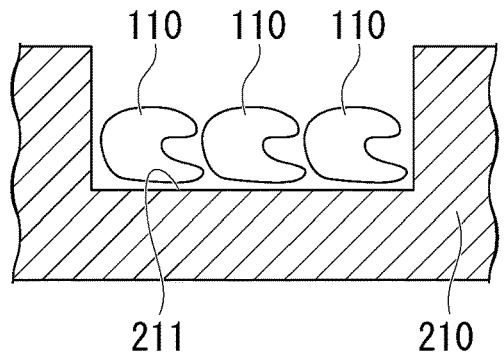
FIG. 4A is a schematic diagram explaining a method for immobilizing a CRISPR/Cas family protein on the inner surface of a well.
Figure 4B:
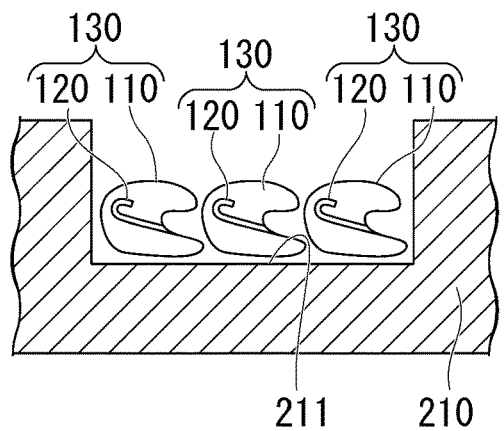
FIG. 4B is a schematic diagram explaining a method for immobilizing a CRISPR/Cas family protein on the inner surface of a well.

As shown in FIG. 4A, the CRISPR/Cas family protein 110 may be immobilized in advance on the inner surface of the wells 211 in the method of the present embodiment. Here, as shown in FIG. 4B, the CRISPR/Cas family protein 110 may bind to the gRNA 120 and may form a bipartite complex 130. As a result, the possibility that the tripartite complex 100 may exist inside the wells 211 when the sample is brought into contact can be enhanced, and the detection sensitivity can be dramatically enhanced.

As a method for immobilizing a CRISPR/Cas family protein on the inner surface of a well 211, a method of covalently bonding a functional group present on the inner surface of the well 211 and a functional group present on the surface of the CRISPR/Cas family protein using physical adsorption and a chemical linker may be mentioned. Examples of the functional group include a hydroxyl group, an amino group, and a thiol group. Alternatively, for example, the CRISPR/Cas family protein may be immobilized on the inner surface of the well 211 by utilizing a click reaction using an azide group and an alkyne group.

Kit for Detecting Target Nucleic Acid Fragment

According to an embodiment, the present invention provides a kit for detecting a target nucleic acid fragment, the kit including:

a baseplate having a well having a volume of 10 aL to 100 pL and formed on the surface;

a gRNA complementary to the target nucleic acid fragment;

a CRISPR/Cas family protein; and a substrate nucleic acid fragment, in which the CRISPR/Cas family protein expresses nuclease activity after forming a tripartite complex with the gRNA and the target nucleic acid fragment, and the substrate nucleic acid fragment is labeled with a fluorescent substance and a quenching substance, and when the substrate nucleic acid fragment is cleaved by the nuclease activity of the tripartite complex so that the fluorescent substance is separated from the quenching substance, the fluorescent substance emits fluorescence upon being irradiated with excitation light. By using the kit of the present embodiment, the above-mentioned method for detecting a target nucleic acid fragment can be suitably carried out.

According to the kit of the present embodiment, the baseplate having a well having a volume of 10 aL to 100 pL and formed on the surface, the target nucleic acid fragment, the gRNA, the CRISPR/Cas family protein, and the substrate nucleic acid fragment are similar to those described above.

According to the kit of the present embodiment, the CRISPR/Cas family protein may be a Cas12 protein or a Cas13 protein. Specific Cas12 protein or Cas13 protein is similar to those described above.

As shown in FIG. 4A, in the kit of the present embodiment, the CRISPR/Cas family protein 110 may be immobilized on the inner surface of the wells 211. Here, as shown in FIG. 4B, the CRISPR/Cas family protein 110 may bind to the gRNA 120 and may form a bipartite complex 130. As a result, the possibility that the tripartite complex 100 may exist inside the wells 211 when the sample is brought into contact can be enhanced, and the detection sensitivity can be dramatically enhanced.

The method for immobilizing the CRISPR/Cas family protein on the inner surface of wells is similar to that described above.

Figure 4C:
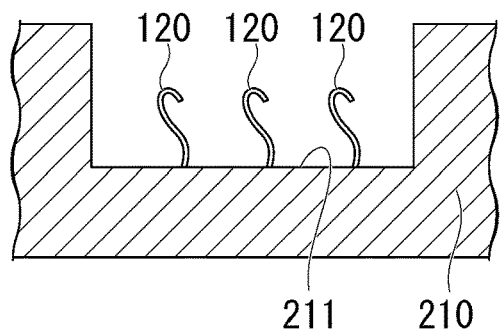
FIG. 4C is a schematic diagram explaining a method for immobilizing a CRISPR/Cas family protein on the inner surface of a well.

Alternatively, as shown in FIG. 4C, in the kit of the present embodiment, the gRNA 120 may be immobilized on the inner surface of the wells 211. Here, an additional sequence that functions as a linker may be added to the gRNA 120.

Figure 4D:
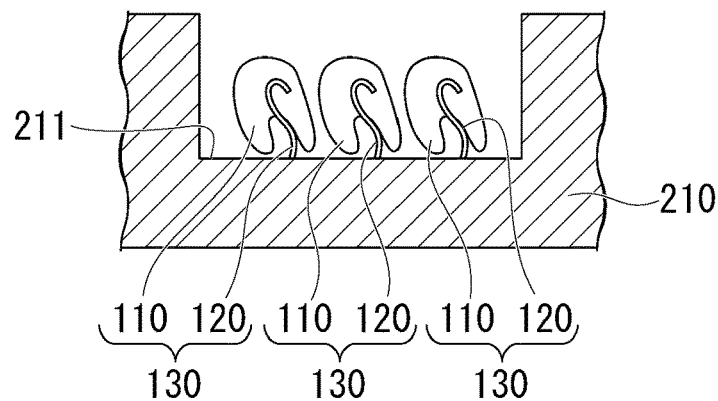
FIG. 4D is a schematic diagram explaining a method for immobilizing a CRISPR/Cas family protein on the inner surface of a well.

As a result, as shown in FIG. 4D, when the CRISPR/Cas family protein 110 is introduced into the wells 211, the CRISPR/Cas family protein 110 binds to the gRNA 120 and forms a bipartite complex 130, and the bipartite complex 130 is immobilized on the inner surface of the wells 211.

Wells having the gRNA immobilized therein may be easily stored as compared to wells having proteins immobilized therein.

EXAMPLES

Next, the present invention will be described in more detail by way of Examples; however, the present invention is not limited to the following Examples.

Materials and Methods

Preparation of Cas12a Protein

An expression vector for *Lachnospiraceae bacterium* ND2006 Cas12a (LbCas12a) was transfected into *Escherichia coli* BL21 (DE3) strain and expressed. The expression vector was a pET-based vector having a 10×His tag, maltose-binding protein (MBP) and a TEV protease cleavage site at the N-terminus. The expressed Cas12a protein was purified using a Ni-NTA resin. Subsequently, TEV protease was reacted overnight at 4° C., cation exchange chromatography was performed using an MBPTrap HP column (GE Healthcare, Inc.) and a HiTrap Heparin HP column (GE Healthcare, Inc.) connected thereto, and then purification was performed by gel filtration chromatography using a Superdex 200 column (GE Healthcare, Inc.).

Preparation of Cas13a Protein

The expression vector of *Leptotrichia wadei* Cas13a (LwCas13a) was transfected into *Escherichia coli* BL21 (DE3) strain and expressed. The expression vector was a pET-based vector having a 10×His tag, maltose-binding protein (MBP) and a TEV protease cleavage site at the N-terminus. The expressed Cas13a protein was purified using a Ni-NTA resin. Subsequently, TEV protease was reacted overnight at 4° C., subsequently cation exchange chromatography was performed using an MBPTrap HP column (GE Healthcare, Inc.) and a HiTrap Heparin HP column (GE Healthcare, Inc.) connected thereto, and purification was performed by gel filtration chromatography using a Superdex 200 column (GE Healthcare, Inc.).

Preparation of Target Nucleic Acid Fragment

A target nucleic acid fragment (double-stranded DNA fragment) was prepared by annealing a single-stranded DNA fragment (SEQ ID NO:5) and a single-stranded DNA fragment complementary thereto, both of which were chemically synthesized by outsourcing (IDT, Inc.). A target nucleic acid fragment (single-stranded RNA fragment, SEQ ID NO:6) was chemically synthesized by outsourcing (IDT, Inc.).

Preparation of gRNA

A DNA fragment encoding gRNA (crRNA) was prepared by PCR amplification using an overlapping primer including a T7 promoter sequence, a target sequence of 20 bases, and a scaffold sequence, as a template. Subsequently, the obtained DNA fragment was subjected to an in vitro transcription reaction, and crRNA was prepared. The base sequence of gRNA (crRNA) for the Cas12a protein is set forth in SEQ ID NO:2, and the base sequence of gRNA (crRNA) for the Cas13a protein is set forth in SEQ ID NO:4.

Preparation of Substrate Nucleic Acid Fragment

A substrate nucleic acid fragment (single-stranded DNA fragment) was chemically synthesized by outsourcing (IDT, Inc.). The 5'-terminus of the substrate nucleic acid fragment was labeled with FAM, which is a fluorescent substance, and the 3'-terminus was labeled with Iowa Black FQ (IDT, Inc.), which is a quenching substance. The base sequence of the chemically synthesized substrate nucleic acid fragment (single-stranded DNA fragment) was "5'-(FAM)TTATT(IABkFQ)-3'" (where "IABkFQ" stands for Iowa Black FQ).

A substrate nucleic acid fragment (single-stranded RNA fragment) was chemically synthesized by outsourcing (IDT, Inc.). The 5'-terminus of the substrate nucleic acid fragment was labeled with FAM, which is a fluorescent substance, and the 3'-terminus was labeled with Iowa Black FQ (IDT, Inc.), which is a quenching substance. The base sequence of the chemically synthesized substrate nucleic acid fragment (single-stranded RNA fragment) was "5'-(FAM)UUUUU(IABkFQ)-3'" (where "IABkFQ" stands for Iowa Black FQ).

Production of Well Array

Figure 5A:
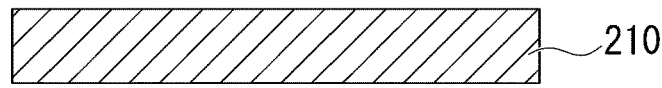
FIG. 5A is a schematic cross-sectional view explaining a step for forming a well array.

FIG. 5A to FIG. 5F are schematic cross-sectional views explaining each step of forming a well array. First, as shown in FIG. 5A, a glass baseplate 210 was immersed in a 10 M potassium hydroxide solution for about 24 hours, and hydroxyl groups were formed on the surface.

Figure 5B:
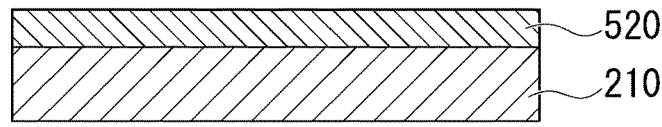
FIG. 5B is a schematic cross-sectional view explaining a step for forming a well array.

Subsequently, as shown in FIG. 5B, a fluororesin (CYTOP, manufactured by AGC, Inc.) was spin-coated on the surface of the glass baseplate 210 to form a film 520. The conditions for spin coating were 2000 revolutions per second (rps) for 30 seconds. Under these conditions, the film thickness of the film 520 is about 500 nm.

Subsequently, the film 520 was brought into close contact with the surface of the glass baseplate 510 by baking the film 520 on a hot plate at 180° C. for 1 hour to dehydrate and condense silanol groups of the film 520 (CYTOP) and the hydroxyl groups on the glass surface.

Figure 5C:
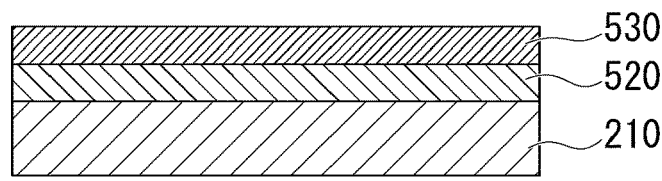
FIG. 5C is a schematic cross-sectional view explaining a step for forming a well array.

Subsequently, as shown in FIG. 5C, a resist (AZ-4903, manufactured by AZ Electronic Materials SA) was spin-coated on the surface of the film 520 at 4000 rps for 60 seconds, and a resist film 530 was formed.

Subsequently, the glass baseplate 210 was baked on a hot plate at 110° C. for 1 hour to evaporate the organic solvent in the resist film 530, and thereby the resist film 530 was brought into close contact with the surface of the film 520.

Figure 5D:
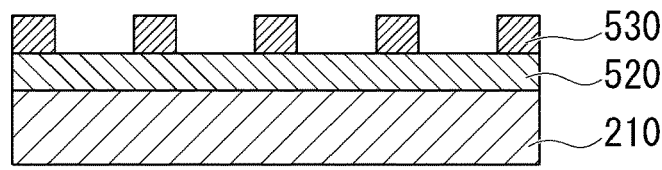
FIG. 5D is a schematic cross-sectional view explaining a step for forming a well array.

Subsequently, as shown in FIG. 5D, the resist film 530 was exposed by irradiating the resist film with ultraviolet radiation at 250 W for 7 seconds in an exposure machine (manufactured by SAN-EI Corporation), using a mask with a well array pattern. Subsequently, the resultant was immersed in a liquid developer (AZ developer, manufactured by AZ Electronic Materials SA) for 5 minutes to be developed. As a result, the resist film 530 at the portions forming wells was removed.

Figure 5E:
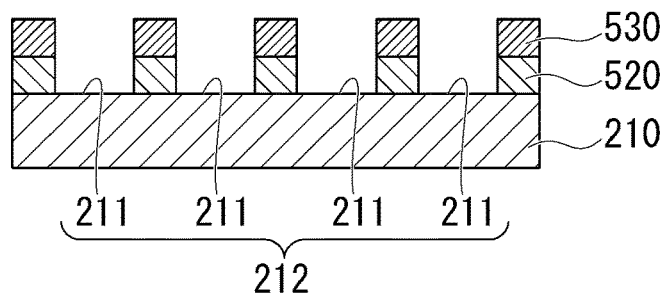
FIG. 5E is a schematic cross-sectional view explaining a step for forming a well array.

Subsequently, as shown in FIG. 5E, the film 520 masked with the resist film 530 was dry-etched for 30 minutes under the conditions of 50 sccm of $O_2$, a pressure 10 Pa, and an output power of 50 W using a Reactive ion etching apparatus (manufactured by Samco, Inc.) to form wells 211 in the film 520.

Figure 5F:
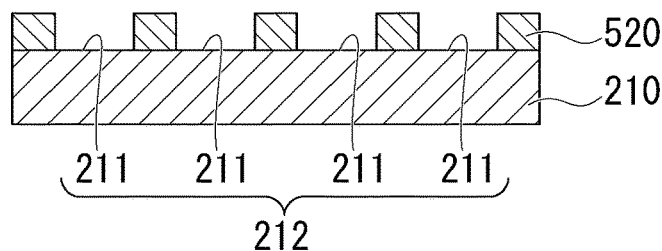
FIG. 5F is a schematic cross-sectional view explaining a step for forming a well array.

Subsequently, as shown in FIG. 5F, the glass baseplate 210 was immersed in acetone, washed with isopropanol, and then washed with pure water to remove the resist film 530, and an array of the wells 211 was obtained. The well array 212 had a shape in which 1,000,000 columnar wells 211 having a diameter of 4 μm and a depth of 500 nm were lined up in 1 cm². The volume per one well of the well array 212 was 6 fL.

Production of Fluid Device

As shown in FIG. 2A and FIG. 2B, a spacer 220 was disposed on the baseplate 210 having the wells 211 formed on the surface, which had been produced as described above, a glass plate 230 on which a liquid inlet port 231 was formed was further placed thereon, and a fluid device was produced.

As a result, a fluid device 200 was formed, in which the space between the well array 212 and the glass plate 230 was a flow channel.

Experimental Example 1

Investigation of Concentration-Dependency of Tripartite Complex

The above-mentioned Cas12a protein, gRNA (SEQ ID NO:2), and target nucleic acid fragment were mixed with a buffer A having the composition shown in the following Table 1 such that the final concentration of the Cas12a protein was 200 nM, the final concentration of the gRNA was 250 nM, and the final concentration of the target nucleic acid fragment was 200 nM, the mixture was left to stand at 37° C. for 30 minutes, and a tripartite complex was formed. Hereinafter, this solution will be referred to as a tripartite complex solution.

TABLE 1

| Buffer A | |
|---|---|
| 20 mM HEPES (pH 7.5), 150 mM KCl | 19.69 mL |
| 2M MgCl$_2$ | 100 μL |
| Glycerol | 200 μL |
| 1M DTT | 10 μL |
| Total | 20 mL |

Furthermore, a solution was prepared in which the substrate nucleic acid fragment was dissolved in buffer B having the composition shown in the following Table 2 so as to obtain a final concentration of 5 μM.

TABLE 2

| Buffer B | |
|---|---|
| 50 mM Tris-HCl (pH 7.6) | 16 mL |
| 2M KCl | 2 mL |
| 2M MgCl$_2$ | 100 μL |
| Glycerol | 2 mL |
| 1M DTT | 40 μL |
| 1M Heparin | 40 μL |
| Milli-Q water | 19.82 mL |
| Total | 40 mL |

Five units of the above-mentioned fluid device were prepared. Subsequently, the above-mentioned tripartite complex solution and the solution of the substrate nucleic acid fragment were mixed, and assay solutions in which the final concentration of the tripartite complex was 266 pM, 133 pM, 67 pM, 34 pM, and 17 pM were prepared and each immediately introduced through the liquid inlet port of each fluid device. As a result, each of the assay solutions was introduced into each well of each well array.

Subsequently, a sealant ("FC-40", Sigma-Aldrich Corporation) was introduced through the liquid inlet port of each fluid device. As a result, the wells into which the assay solution had been introduced were sealed with the sealant, and each well served as an independent reaction space. After a few minutes, the well array of each fluid device was observed with a fluorescence microscope.

Figure 6A:
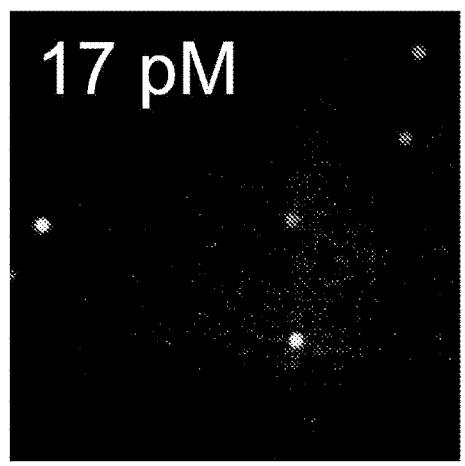
FIG. 6A is a representative fluorescence micrograph showing the results of Experimental Example 1.
Figure 6B:
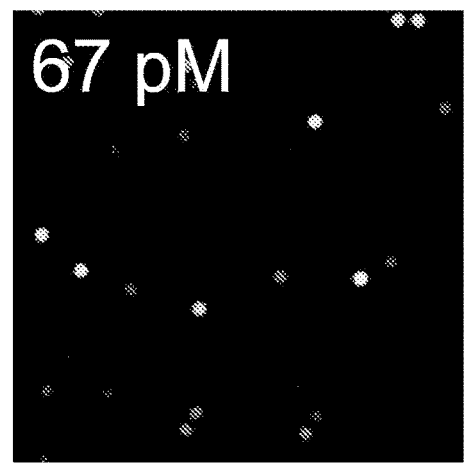
FIG. 6B is a representative fluorescence micrograph showing the results of Experimental Example 1.
Figure 6C:
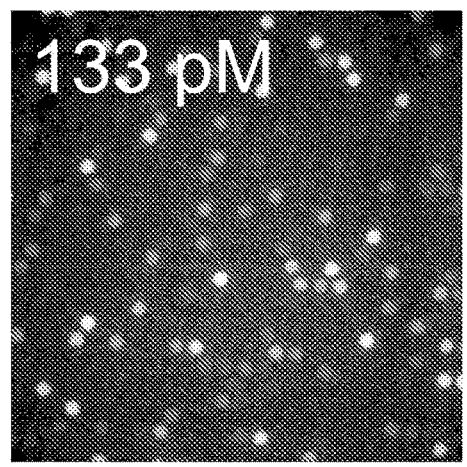
FIG. 6C is a representative fluorescence micrograph showing the results of Experimental Example 1.
Figure 6D:
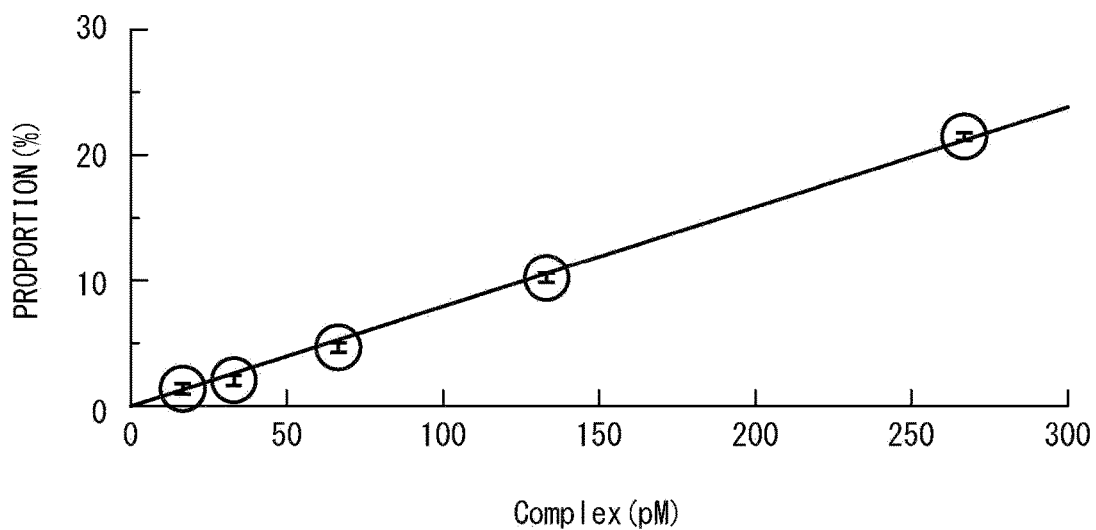
FIG. 6D is a graph showing the results of Experimental Example 1.

FIG. 6A is a representative fluorescence micrograph showing the results of the assay solution in which the final concentration of the tripartite complex was 17 pM. FIG. 6B is a representative fluorescence micrograph showing the results of the assay solution in which the final concentration of the tripartite complex was 67 pM. FIG. 6C is a representative fluorescence micrograph showing the results of the assay solution in which the final concentration of the tripartite complex was 133 pM. Furthermore, FIG. 6D is a graph showing the results of calculating the proportion of wells in which fluorescence was detected based on the photographs of the well array into which each of the assay solutions was introduced.

As a result, it was clear that the proportion of wells in which fluorescence was detected increased in a manner dependent on the concentration of the tripartite complex.

Experimental Example 2

Investigation of Concentration-Dependency of Target Nucleic Acid Fragment

The above-mentioned Cas12a protein, gRNA (SEQ ID NO:2), and target nucleic acid fragment were mixed with the buffer A having the composition shown in the above-described Table 1 such that the final concentration of the Cas12a protein was 200 nM, the final concentration of the gRNA was 250 nM, and the final concentration of the target nucleic acid fragment was 4000 pM, 400 pM, 40 pM, 4 pM, and 0.4 pM, the mixture was left to stand at 37° C. for 30 minutes, and a tripartite complex was formed. Hereinafter, this solution will be referred to as a tripartite complex solution.

Five units of the above-mentioned fluid device were prepared. Furthermore, a solution was prepared in which the substrate nucleic acid fragment was dissolved in the buffer B having the composition shown in the above-described Table 2 so as to obtain a final concentration of 5 µM.

Subsequently, assay solutions in which the above-mentioned tripartite complex solution and the solution of the substrate nucleic acid fragment were mixed were each prepared and immediately introduced through the liquid inlet port of each fluid device. As a result, the assay solution was introduced into each well of the well array.

Subsequently, a sealant ("FC-40", Sigma-Aldrich Corporation) was introduced through the liquid inlet port of each fluid device. As a result, the wells into which the assay solution had been introduced were sealed with the sealant, and each well served as an independent reaction space. After a few minutes, the well array of each fluid device was observed with a fluorescence microscope.

Figure 7A:
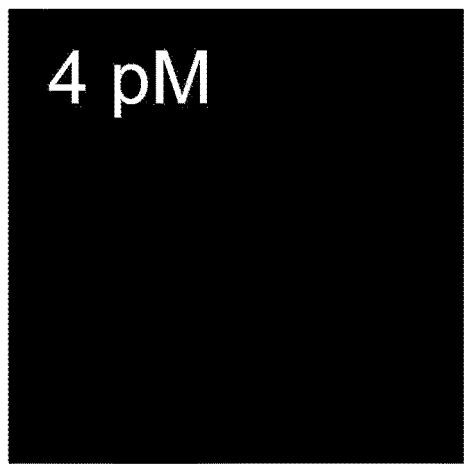
FIG. 7A is a representative fluorescence micrograph showing the results of Experimental Example 2.
Figure 7B:
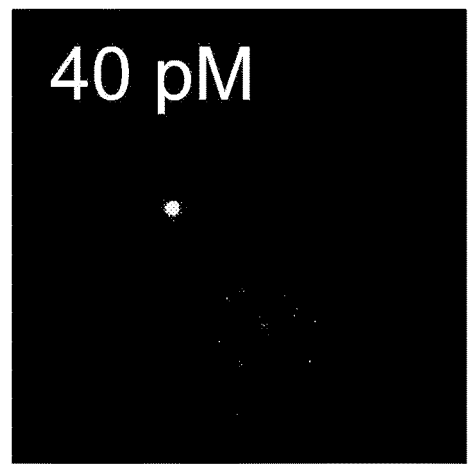
FIG. 7B is a representative fluorescence micrograph showing the results of Experimental Example 2.
Figure 7C:
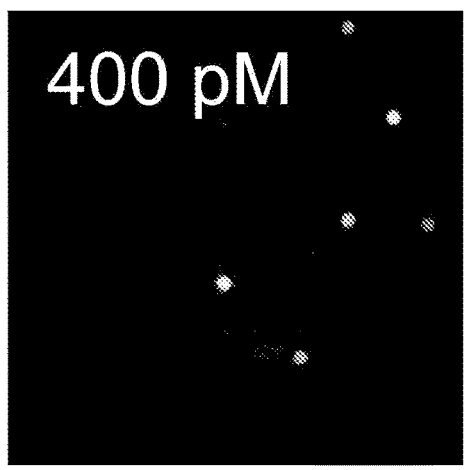
FIG. 7C is a representative fluorescence micrograph showing the results of Experimental Example 2.
Figure 7D:
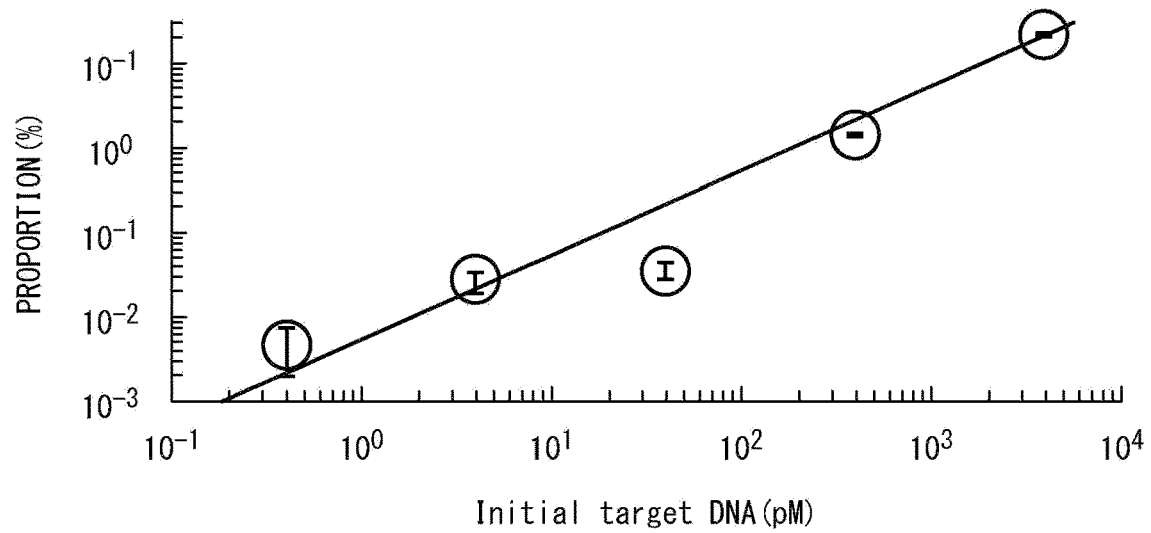
FIG. 7D is a graph showing the results of Experimental Example 2.

FIG. 7A is a representative fluorescence micrograph showing the results of an assay solution in which the final concentration of the target nucleic acid fragment was 4 pM. FIG. 7B is a representative fluorescence micrograph showing the results of an assay solution in which the final concentration of the target nucleic acid fragment was 40 pM. FIG. 7C is a representative fluorescence micrograph showing the results of an assay solution in which the final concentration of the target nucleic acid fragment was 400 pM. Furthermore, FIG. 7D is a graph showing the results of calculating the proportion of wells in which fluorescence was detected based on the photographs of the well array into which each of the assay solutions was introduced.

As a result, it was clear that the proportion of wells in which fluorescence was detected increased in a manner dependent on the concentration of the target nucleic acid fragment.

Experimental Example 3

Investigation Using Cas13a 1

The above-mentioned Cas13a protein, gRNA (SEQ ID NO.4), and target nucleic acid fragment were mixed with the buffer A having the composition shown in the above-described Table 1 such that the final concentration of the Cas13a protein was 200 nM, the final concentration of the gRNA was 250 nM, and the final concentration of the target nucleic acid fragment was 200 nM, the mixture was left to stand at 37° C. for 30 minutes, and a tripartite complex was formed.

Furthermore, solutions were each prepared in which the substrate nucleic acid fragment was dissolved in the buffer B having the composition shown in the above-described Table 2 so as to obtain a final concentration of 2, 5, or 10 µM.

Four units of the above-mentioned fluid device were prepared. Subsequently, the above-mentioned tripartite complex solution and the solution of the substrate nucleic acid fragment were mixed, and assay solutions in which the final concentration of the tripartite complex was 30 pM and the final concentration of the substrate nucleic acid fragment was 2, 5, or 10 µM were each prepared and immediately introduced through the liquid inlet port of each fluid device. Furthermore, an assay solution that did not include the target nucleic acid fragment was also prepared for comparison and was introduced through the liquid inlet port of the fluid device. As a result, each of the assay solutions was introduced into each well of each well array.

Subsequently, a sealant ("HEXADECANE", Sigma-Aldrich Corporation) was introduced through the liquid inlet port of each fluid device. As a result, the wells into which the assay solution had been introduced were sealed with the sealant, and each well served as an independent reaction space. Subsequently, the well array of each fluid device was observed with a fluorescence microscope over time.

Figure 8A:
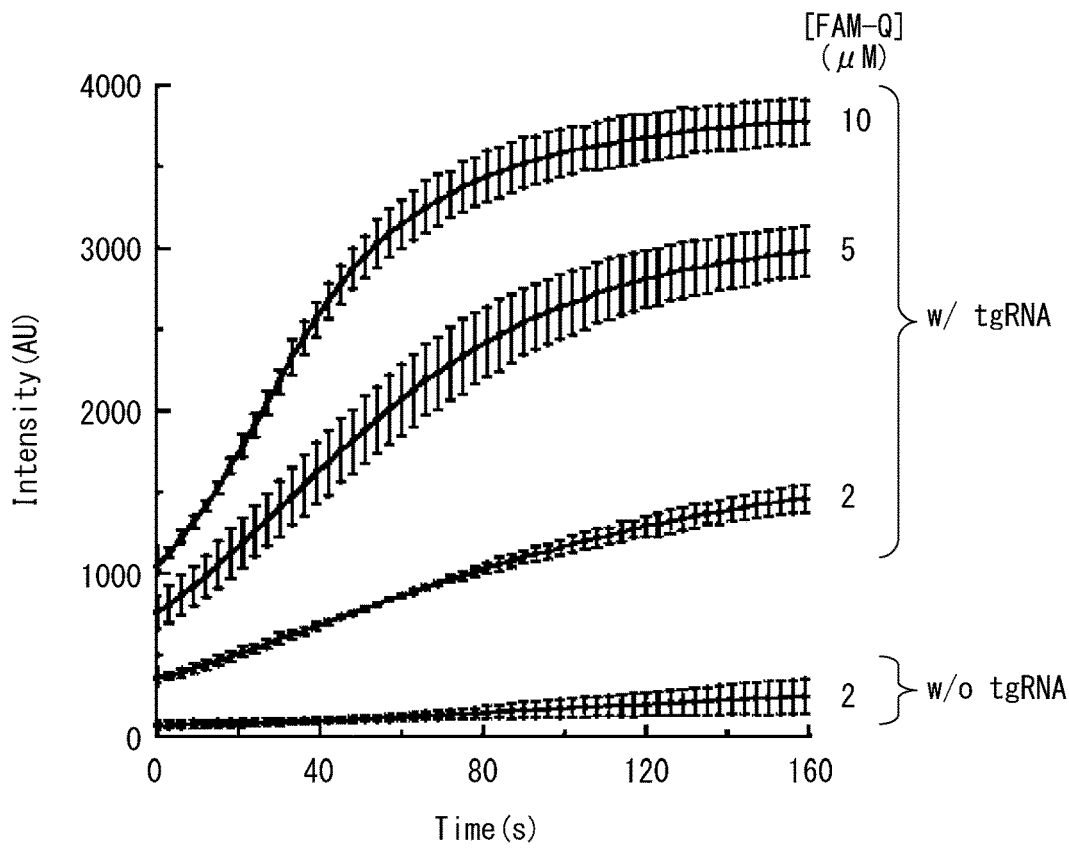
FIG. 8A is a graph showing the results of Experimental Example 3.

FIG. 8A is a graph summarizing the changes over time in the fluorescence intensity in the wells in which fluorescence of each assay solution was detected. The axis of abscissa represents time (seconds), and the axis of ordinate represents fluorescence intensity. In FIG. 8A, "w/o tgRNA" indicates the result of the assay solution containing no target nucleic acid fragment, "w/tgRNA" indicates the result of the assay solution containing the target nucleic acid fragment, and "FAM-Q" indicates the substrate nucleic acid fragment. As a result, it was clarified that the increase in fluorescence intensity was saturated in about 2 minutes.

Figure 8B:
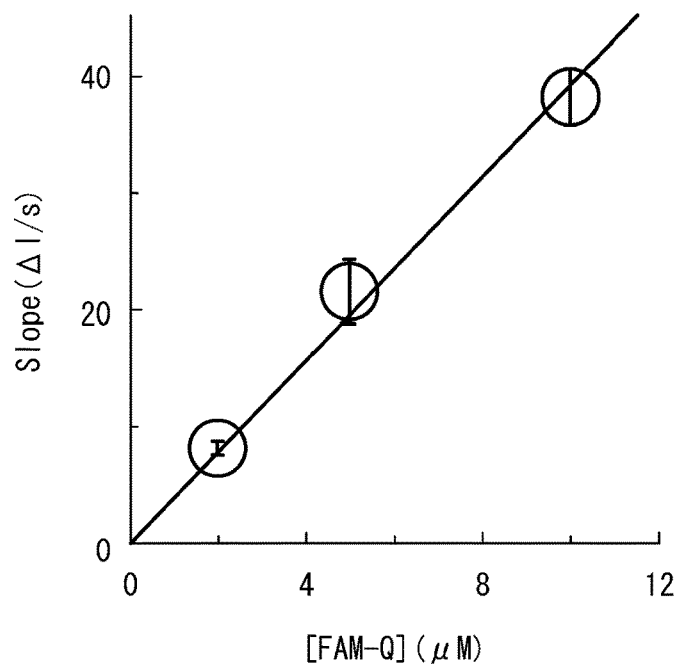
FIG. 8B is a graph showing the results of Experimental Example 3.

FIG. 8B is a graph showing the relationship between the concentration of the substrate nucleic acid fragment and the rate of increase in fluorescence intensity, based on FIG. 8A. The axis of abscissa represents the concentration (µM) of the substrate nucleic acid fragment, and the axis of ordinate represents the rate of increase in fluorescence intensity (ΔI/s). As a result, it was clear that the rate of increase in fluorescence intensity is proportional to the concentration of the substrate nucleic acid fragment.

Experimental Example 4

Investigation Using Cas13a 2

The above-mentioned Cas13a protein, gRNA (SEQ ID NO.4), and target nucleic acid fragment were mixed with the buffer A having the composition shown in the above-described Table 1 such that the final concentration of the Cas13a protein was 200 nM, the final concentration of the gRNA was 250 nM, and the final concentration of the target nucleic acid fragment was 30 pM, 3 pM, 0.3 pM, and 0 pM, the mixture was left to stand at 37° C. for 30 minutes, and a tripartite complex was formed. Hereinafter, this solution will be referred to as a tripartite complex solution.

Four units of the above-mentioned fluid device were prepared. Furthermore, a solution was prepared in which the substrate nucleic acid fragment was dissolved in the buffer B having the composition shown in the above-described Table 2 so as to obtain a final concentration of 5 μM.

Subsequently, assay solutions in which the above-mentioned tripartite complex solution and the solution of the substrate nucleic acid fragment were mixed were each prepared and immediately introduced through the liquid inlet port of each fluid device. As a result, the assay solution was introduced into each well of the well array.

Subsequently, a sealant ("HEXADECANE", Sigma-Aldrich Corporation) was introduced through the liquid inlet port of each fluid device. As a result, the wells into which the assay solution had been introduced were sealed with the sealant, and each well served as an independent reaction space. After a few minutes, the well array of each fluid device was observed with a fluorescence microscope.

FIG. 9A is a representative fluorescence micrograph showing the results of an assay solution in which the final concentration of the target nucleic acid fragment was 0 pM. FIG. 9B is a representative fluorescence micrograph showing the results of an assay solution in which the final concentration of the target nucleic acid fragment was 0.3 pM. FIG. 9C is a representative fluorescence micrograph showing the results of an assay solution in which the final concentration of the target nucleic acid fragment was 3 pM. Furthermore, FIG. 9D is a representative fluorescence micrograph showing the results of the assay solution in which the final concentration of the target nucleic acid fragment was 30 pM. The scale bar indicates 50 μm.

Figure 10A:
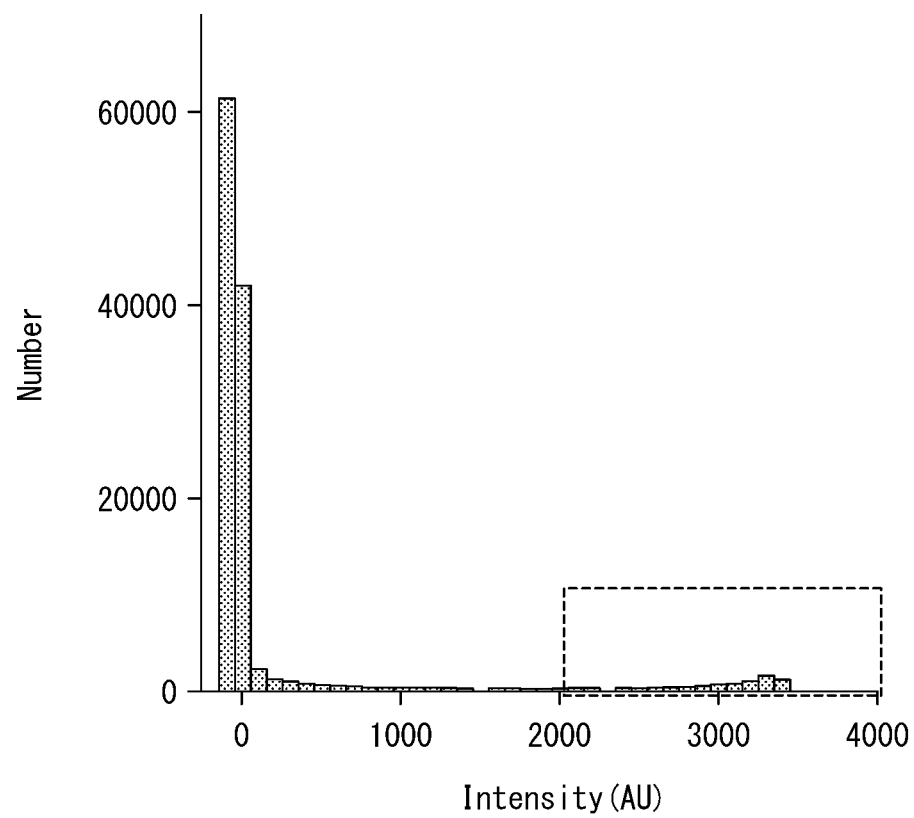
FIG. 10A is a graph showing the results of Experimental Example 4.
Figure 10B:
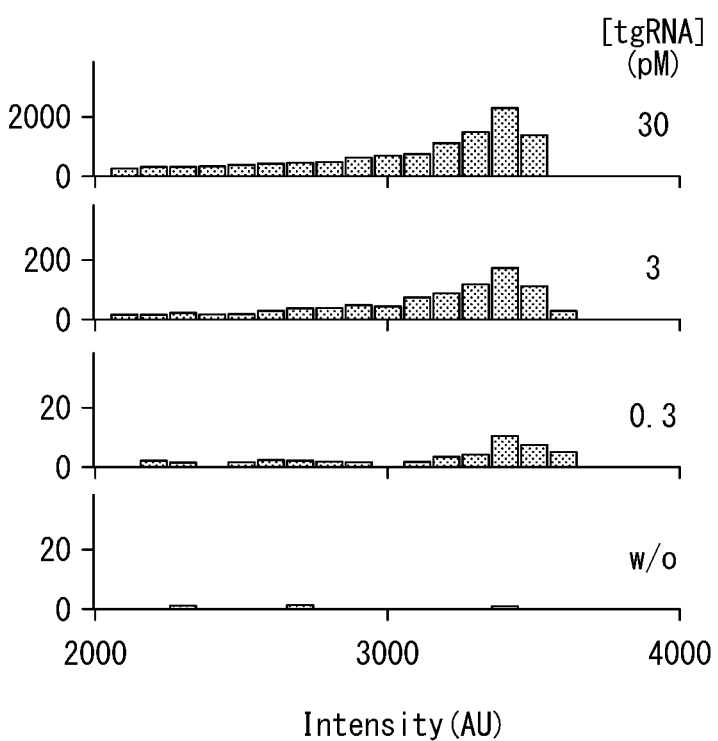
FIG. 10B is a graph showing the results of Experimental Example 4.

FIG. 10A is a representative graph showing the number of wells showing a predetermined fluorescence intensity (relative value) based on the photographs of the well arrays into which each of the assay solutions was introduced. FIG. 10B shows the same graph as that of FIG. 10A for the assay solution in which the final concentrations of the target nucleic acid fragment were 30 pM, 3 pM, 0.3 pM, and 0 pM, and shows graphs in which the region corresponding to the region surrounded by dotted lines in FIG. 10A is magnified and arranged side by side.

As a result, it was clear that the proportion of wells in which fluorescence was detected increased in a manner dependent on the concentration of the target nucleic acid fragment.

Figure 11:
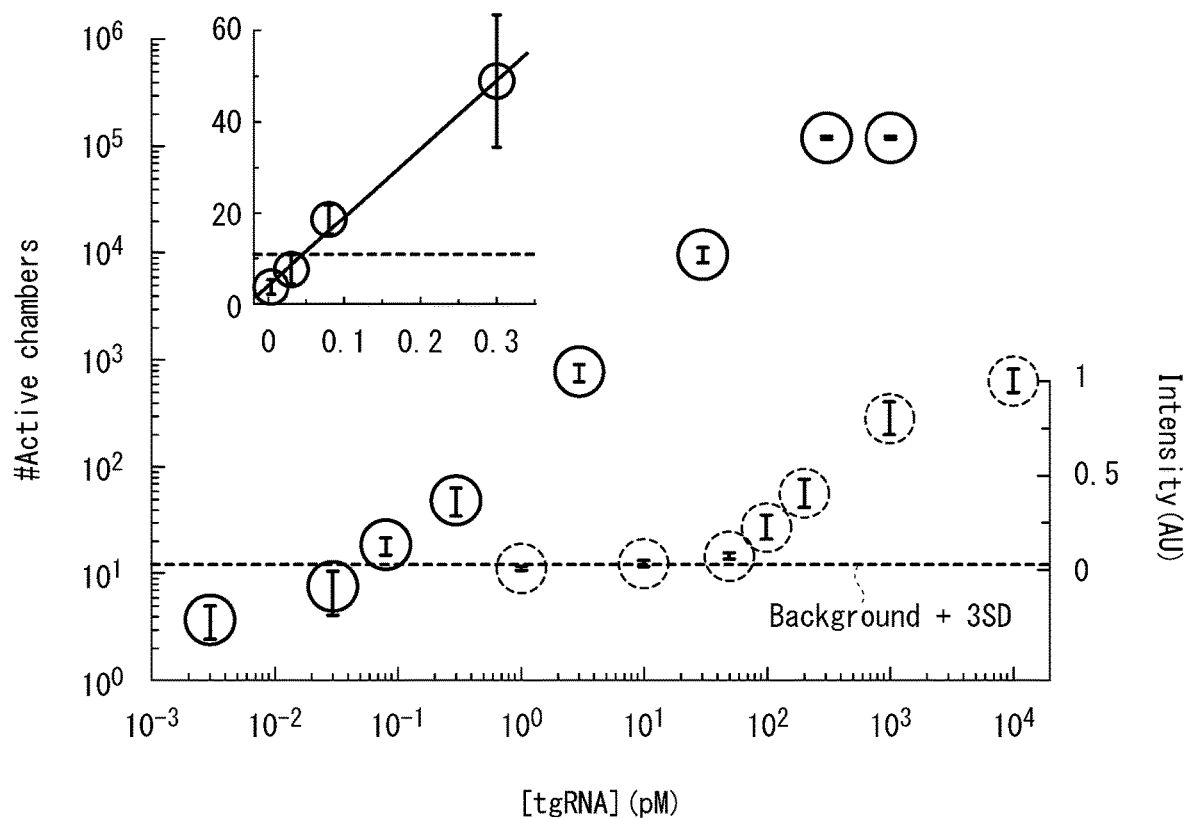
FIG. 11 is a graph showing the results of Experimental Example 4.

FIG. 11 is a graph showing the relationship between the number of wells in which fluorescence was detected and the final concentration of the target nucleic acid fragment. The axis of ordinate represents the number of wells in which fluorescence was detected, and the axis of abscissa represents the final concentration of the target nucleic acid fragment. In FIG. 11, solid-lined circles indicate the results of using the fluid devices, and dashed-lined circles indicate the results of performing a similar experiment using plate readers. In FIG. 11, the upper left graph shows a magnified view. In the experiments performed using plate readers, 384-well plates were used instead of the fluid devices. As a result, it was found that the detection sensitivity in the case of using the fluid devices was 56 fM.

INDUSTRIAL APPLICABILITY

According to the present invention, a technology capable of detecting a target nucleic acid fragment with high sensitivity without amplifying the target nucleic acid fragment can be provided.

The invention claimed is:

1. A method for detecting a target nucleic acid fragment in a sample, the method comprising:
(a) bringing the sample into contact with a gRNA complementary to the target nucleic acid fragment, a CRISPR/Cas family protein, and a substrate nucleic acid fragment in a reaction space, wherein:
(1) when the sample contains the target nucleic acid fragment, the CRISPR/Cas family protein forms a tripartite complex with the gRNA and the target nucleic acid fragment, where the tripartite complex has nuclease activity,
(2) the CRISPR/Cas family protein is a Cas12 protein or a Cas13 protein,
(3) the substrate nucleic acid fragment is labeled with a fluorescent substance and a quenching substance, and in the presence of the tripartite complex, the substrate nucleic acid fragment is cleaved by the nuclease activity of the tripartite complex separating the fluorescent substance from the quenching substance, such that the separated fluorescent substance emits fluorescence upon being irradiated with excitation light, and
(4) the reaction space has a volume of 10 aL to 100 pL, and the reaction space is a well formed in a baseplate, wherein the opening of the well is sealed by a lipid membrane; and
(b) irradiating the fluorescent substance with excitation light and detecting any fluorescence from the fluorescent substance, wherein detection of the fluorescence indicates that the target nucleic acid fragment is present in the sample,
wherein the method is performed without amplifying the target nucleic acid fragment.

2. The method according to claim 1, wherein 0 molecules or 1 molecule of the target nucleic acid fragment is introduced into the reaction space.

3. The method according to claim 1, wherein the CRISPR/Cas family protein is immobilized on an inner surface of the well.

4. A kit for detecting a target nucleic acid fragment without amplifying the target nucleic acid fragment, the kit comprising:
   a baseplate having a well having a volume of 10 aL to 100 pL;
   a gRNA complementary to the target nucleic acid fragment;
   a CRISPR/Cas family protein, wherein the CRISPR/Cas family protein is a Cas12 protein or a Cas13 protein; and
   a substrate nucleic acid fragment,
   wherein the opening of the well is sealed by a lipid membrane,
   wherein the CRISPR/Cas family protein expresses nuclease activity after forming a tripartite complex with the gRNA and the target nucleic acid fragment, and
   the substrate nucleic acid fragment is labeled with a fluorescent substance and a quenching substance, and the substrate nucleic acid fragment is cleaved by the nuclease activity of the tripartite complex separating the fluorescent substance from the quenching substance, wherein the separated fluorescent substance emits fluorescence upon being irradiated with excitation light.

5. The kit according to claim 4, wherein the CRISPR/Cas family protein is immobilized on an inner surface of the well.

6. The kit according to claim 4, wherein the gRNA is immobilized on an inner surface of the well.

7. The method according to claim 1, wherein the reaction space has a volume of 10 aL to 10 fL.

8. The method according to claim 1, wherein the opening of the well is sealed by a lipid bilayer membrane.

9. The kit according to claim 4, wherein the well has a volume of 10 aL to 10 fL.

10. The kit according to claim 4, wherein the opening of the well is sealed by a lipid bilayer membrane.

11. The kit according to claim 4, wherein the gRNA, CRISPR/Cas family protein, and substrate nucleic acid fragment are present in the well.

* * * * *